(12) United States Patent
Sheets, Sr.

(10) Patent No.: US 7,422,680 B2
(45) Date of Patent: Sep. 9, 2008

(54) ANIMAL WASTE EFFLUENT TREATMENT SYSTEM

(76) Inventor: Richard G. Sheets, Sr., 7865 NE. Day Rd. W., Bainbridge Island, WA (US) 98110

( * ) Notice: Subject to any disclaimer, the term of this patent is extended or adjusted under 35 U.S.C. 154(b) by 0 days.

(21) Appl. No.: 11/072,462

(22) Filed: Mar. 7, 2005

(65) Prior Publication Data
US 2005/0145552 A1      Jul. 7, 2005

Related U.S. Application Data

(62) Division of application No. 10/720,761, filed on Nov. 25, 2003, now Pat. No. 6,863,826.

(60) Provisional application No. 60/507,519, filed on Oct. 2, 2003, provisional application No. 60/428,722, filed on Nov. 25, 2002.

(51) Int. Cl.
*C02F 1/36* (2006.01)

(52) U.S. Cl. .................. 210/143; 210/149; 210/199; 210/748; 210/919

(58) Field of Classification Search .................. 210/188
See application file for complete search history.

(56) References Cited

U.S. PATENT DOCUMENTS

| | | | |
|---|---|---|---|
| 3,772,188 A | | 11/1973 | Edwards |
| 3,947,350 A | * | 3/1976 | Cardinal, Jr. ................ 210/711 |
| 4,046,689 A | | 9/1977 | Argyll |
| 4,137,158 A | * | 1/1979 | Ishida et al. ................ 210/605 |
| 4,340,488 A | | 7/1982 | Toth et al. |
| 4,530,714 A | * | 7/1985 | Kolc et al. ................ 71/28 |
| 4,559,143 A | | 12/1985 | Asada et al. |
| 4,772,307 A | | 9/1988 | Kiss et al. |
| 5,232,429 A | | 8/1993 | Cizek et al. |
| 5,417,861 A | * | 5/1995 | Burnham ................ 210/609 |
| 5,462,672 A | | 10/1995 | Iji et al. |
| 5,507,250 A | * | 4/1996 | Reddy et al. ................ 119/173 |

(Continued)

OTHER PUBLICATIONS

Robert S. Bowman, "SMZ/ZVI Pellets for Combined Sorption/Reduction", Earth and Environmental Science, New Mexico Tech.

(Continued)

*Primary Examiner*—Peter A. Hruskoci
(74) *Attorney, Agent, or Firm*—Mots Law, PLLC; Marvin A. Motsenbocker

(57) ABSTRACT

Animal waste such as fecal material from swine, chicken, turkey, and cattle is converted into useful forms such as fertilizer, other types of soil builders, and even nutrient feed additives. Devices, systems, and methods are provided that allow economical conversion and in many instances, alleviate the production and release of undesirable gases such as sulfide and ammonia. In one embodiment, undesirable anaerobic and facultative anaerobic bacteria are killed at a greater rate than desirable soil compatible aerobic bacteria. The use of low temperature killing diminishes off gassing commonly associated with other techniques, and the use of gas trapping additives such as zeolites provides enhanced soil building qualities such as slow release of nitrogen and slow release of moisture to soil. The methods allow convenient adjustment of composition, allowing conversion of waste into tailored designer fertilizer suited for particular soils. Other embodiments provide other soil building qualities as well as nutrient qualities for feedstock used in animal husbandry such as aquaculture.

15 Claims, 5 Drawing Sheets

U.S. PATENT DOCUMENTS

| | | | | |
|---|---|---|---|---|
| 5,614,102 A | * | 3/1997 | Sakurada | 210/718 |
| 5,821,112 A | * | 10/1998 | Botto et al. | 435/262 |
| 5,827,432 A | | 10/1998 | Huhtamaki et al. | |
| 5,895,577 A | | 4/1999 | Frei et al. | |
| 5,945,333 A | * | 8/1999 | Rehberger | 435/268 |
| 5,961,837 A | * | 10/1999 | Ferrara et al. | 210/696 |
| 6,387,267 B1 | | 5/2002 | Kantardjieff | |
| 6,409,788 B1 | * | 6/2002 | Sower | 71/11 |
| 6,410,305 B1 | * | 6/2002 | Miller et al. | 435/268 |
| 6,638,429 B1 | | 10/2003 | Bussmann et al. | |
| 6,685,902 B2 | * | 2/2004 | Morin et al. | 423/244.01 |
| 7,018,546 B2 | * | 3/2006 | Kurihara et al. | 210/748 |
| 7,108,784 B1 | * | 9/2006 | Litz et al. | 210/182 |

OTHER PUBLICATIONS

Robert S. Bowman, "SMZ for Removal of Pathogens from Sewage", Earth and Environmental Science, New Mexico Tech.

A. Tiehm et al., "The Use of Ultrasound to Accelerate the Anaerobic Digestion of Sewage Sludge", Technical University of Hamburg-Harburg, Hamburg, Germany.

H. Utsumi et al., "Fate of coliphage in waste water treatment process and detection of phages carrying the Shiga toxin type 2 gene", Water Quality and Environmental Management in Asia, Water Science & Technology, 2002, vol. 45, No. 11-12, pp. 285-289.

www.hielscher.com/ultrasonics/sludge05.htm;

Hielscher—Ultrasound Technology; Ultrasonic Sewage Sludge Treatment—Anaerobic Stabilization.

www.smithfieldfoods.com/ENVIRO/TECHNOLOGY.

www.dirkgroup.com.

* cited by examiner

Figure 3

| Sample No. | | 1E | 6E |
|---|---|---|---|
| Sample Description | | Effluent Initial | After |
| | | | |
| Parameter | Units | | |
| Alkalinity as CaCO3 | mg/L | 21,100 | 17,700 |
| Biochemical Oxygen Demand (B.O.D.) | mg/L | 5,210 | 5,680 |
| Chemical Oxygen Demand (C.O.D.) | mg/L | 36,300 | 39,600 |
| pH | | 7.74 | 7.9 |
| Total Dissolved Solids (TDS) | mg/L | 900 | 7,800 |
| Total Solids (TS) | % Wet | 3.63 | 3.03 |
| Total Solids (TS) | mg/L | 38,700 | 42,900 |
| Total Volatile Solids (TVS) | mg/L | 21,800 | 26,600 |
| Total Suspended Solids (TSS) | mg/L | 37,800 | 35,100 |
| Volatile Suspended Solids (VSS) | | 22,000 | 20,500 |
| Acid Volatile Sulfides | mg/L ppm | 305 | 202 |
| Calcium | mg/kg ppm | 32,300 | 40,200 |
| Hardness as CaCO3 | mg/L | 5,930 | 5,880 |
| Ammonia | | | |
| Ammonia as Nitrogen | mg/L | 4,710 | 4,190 |
| Nitrate | mg/L | | |
| Nitrite as Nitrogen | mg/L | ND | 1.9 |
| Nitrate as Nitrogen | mg/L | ND | ND |
| Ortho-Phosphate as Phosphorus | mg/L | 297 | 346 |
| Total Phosphate | mg/L | | |
| Total Phosphorus | mg/L | 1,690 | 1,540 |
| Total Kjeldahl Nitrogen | mg/L | 6,940 | 6,770 |
| Arsenic | mg/kg | ND | ND |
| Cadmium | mg/kg | ND | ND |
| Chromium | mg/kg | 14.4 | 19 |
| Copper | mg/kg | 842 | 1,210 |
| Lead | mg/kg | ND | ND |
| Mercury | mg/kg | ND | ND |
| Molybdenum | mg/kg | 13.5 | 18 |
| Nickel | mg/kg | 37 | 49.5 |
| Selenium | mg/kg | 7.7 | 9.7 |
| Zinc | mg/kg | 2,060 | 2,370 |
| Sulfur | mg/kg | 307 | 348 |
| Total Organic Carbon | mg/L | 7,210 | 9,020 |
| Heterotrophic Plate Count | CFU/100ml | 2,940,000 | 3,600,000 |
| Fecal Streptococcus | MPN/100ml | 500,000 | 240,000 |
| Escherichia Coli | MPN/100ml | >242,000 | 3,000 |
| Fecal Coliform | MPN/100ml | 7,000 | 3,000 |
| Fecal Coliform (calculated) | MPN/g | 1,809 | 699 |
| Total Coliform | MPN/100ml | 17,000 | 5,000 |
| Enterococcus | MPN/100ml | 500,000 | 240,000 |

Figure 4

| Sample Description | Units | Wet Solids | Air Dried Solids | EarthSeal™ |
|---|---|---|---|---|
| Parameter | Units | | | |
| Chemical Oxygen Demand (C.O.D.) | mg/kg | 754,000 | | |
| pH | | 8.28 | 8.24 | 7.62 |
| Total Solids (TS) | % | 18.4 | 86.2 | 58.4 |
| Total Volatile Solids (TVS) | % | 56.7 | 56.1 | 56.7 |
| Acid Volatile Sulfide | mg/L | 1,960.0 | | |
| Calcium | mg/kg ppm | 33,700 | 1,960 | 1,780 |
| Ammonia as Nitrogen | mg/kg | 128,000 | 445 | 668 |
| Nitrite as Nitrogen | mg/kg | ND | | |
| Nitrate as Nitrogen | mg/kg | ND | 5.2 | 3.5 |
| Ortho-Phosphate as Phosphorus | mg/kg | 1,950 | 3,070 | 3,670 |
| Total Phosphorus | mg/kg | 32,900 | 39,400 | 39,800 |
| Total Kjeldahl Nitrogen | mg/kg | 56,300 | 33,100 | 42,300 |
| Arsenic | mg/kg | 3.8 | <0.7 | <0.7 |
| Cadmium | mg/kg | ND | 1.4 | 1.71 |
| Chromium | mg/kg | 10.9 | | |
| Copper | mg/kg | 929 | 956 | 1,060 |
| Lead | mg/kg | ND | 5.14 | 4.42 |
| Mercury | mg/kg | ND | <0.08 | <0.08 |
| Molybdenum | mg/kg | 11.3 | 14.4 | 15.7 |
| Nickel | mg/kg | 19.9 | 21.2 | 20.7 |
| Selenium | mg/kg | 4.9 | 3.95 | 3.67 |
| Zinc | mg/kg | 2,160 | 1,780 | 1,810 |
| Sulfur | mg/kg | 9,320 | | |
| Total Organic Carbon | mg/L | 30.9 | | |
| Heterotrophic Plate Count | CFU/g | 9,950,000 | 15,500 | 3,350,000 |
| Fecal Streptococcus | CFU/g | 70,700 | 9,420 | 2,360 |
| Escherichia Coli | MPN/g | *435 | Int. | Int. |
| Fecal Coliform | CFU/g | 435 | <1 | <1 |
| Total Coliform | CFU/g | 70,700 | <1 | 131.9 |
| Enterococcus | MPN/g | 70,700 | NT | NT |

Key:
ND= Non Detected
NT= Not Tested
Int.= Interference
* = MPN/g (dry)

Figure 5

| SSEA Test Run No. | | 1 | 4 | 4 | 5 | 5 |
|---|---|---|---|---|---|---|
| SSEA Sampling ID | | 1E | 8F | 9F | 8F | 9F |
| Analytical Lab Sample No. | | 1 | 8F | 9F | 28F | 29F |
| Analytical Lab | | CAS | CAS | CAS | TWISS | TWISS |
| Testing Desired | Units | | | | | |
| Alkalinity as CaCO3 | mg/L | 21,100 | 15,200 | 12,800 | 19,300 | 11,100 |
| Biochemical Oxygen Demand (B.O.D.) | mg/L | 5,210 | 3,610 | 3,130 | | |
| Chemical Oxygen Demand (C.O.D.) | mg/L | 36,300 | 6,800 | 13,400 | 12,100 | 8,400 |
| pH | | 7.74 | 8.32 | 8.23 | 8.24 | 7.62 |
| Total Dissolved Solids (TDS) | mg/L | 900 | 14,600 | 11,300 | | |
| Total Solids (TS) | % Wet | 3.63 | | | | |
| Total Solids (TS) | mg/L | 38,700 | 19,200 | 22,900 | | |
| Solids Volatile (vs) | mg/L | | 8,320 | 8,120 | | |
| Total Volatile Solids (TVS) | mg/L | 21,800 | 130 | 270 | | |
| Total Suspended Solids (TSS) | mg/L | 37,800 | 270 | 760 | | |
| Volatile Suspended Solids (VSS) | mg/L | 22,000 | | | | |
| Acid Volatile Sulfides | mg/L ppm | 305 | 39.5 | 1.2 | | |
| Calcium | mg/kg ppm | 32,300 | NT | 241,000 | 4,970 | 24,700 |
| Hardness as CaCO3 | mg/L | 5,930 | | 155 | 160 | 1,200 |
| Ammonia as Nitrogen | mg/L | 4,710 | 4,410 | 2,140 | 462 | 388 |
| Nitrite as Nitrogen | mg/L | ND | ND | 2 | | |
| Nitrate as Nitrogen | mg/L | ND | ND | 16 | 1.14 | 7.44 |
| Ortho-Phosphate as Phosphorus | mg/L | 297 | 282 | 148 | 274 | 26.6 |
| Total Phosphorus | mg/L | 1,690 | 290 | 172 | 300 | 176 |
| Total Kjeldahl Nitrogen | mg/L | 6,940 | 5,050 | 2,500 | 4,070 | 884 |
| Arsenic | mg/kg | ND | NT | *ND | 2.95 | 3.74 |
| Cadmium | mg/kg | ND | NT | *ND | <0.053 | 0.41 |
| Chromium | mg/kg | 14.4 | NT | *210 | | |
| Copper | mg/kg | 842 | NT | *2080 | 85.3 | 85.5 |
| Lead | mg/kg | ND | NT | *ND | <0.42 | 1.78 |
| Mercury | mg/kg | ND | ND | *ND | <0.04 | <0.04 |
| Molybdenum | mg/kg | 13.5 | NT | *146 | 6.53 | 5.51 |
| Nickel | mg/kg | 37 | NT | *857 | 48.9 | 24.6 |
| Selenium | mg/kg | 7.7 | NT | *123 | 7.53 | 4.39 |
| Zinc | mg/kg | 2,060 | NT | *3070 | 129 | 71 |
| Sulfur | mg/L | 307 | 159 | 169 | | |
| Total Organic Carbon | mg/L | 7,210 | 5,390 | 4,540 | | |
| Heterotrophic Plate Count | CFU/100ml | 2,940,000 | 695,000 | 620,000 | **283,177.57 | **29,894,737 |
| Fecal Streptococcus | MPN/100ml | 500,000 | 300,000 | 280,000 | **3,060,748 | **3,473,684 |
| Escherichia Coli | MPN/100ml | >242,000 | ND | ND | Int. | Int. |
| Fecal Coliform | MPN/100ml | 7,000 | 20 | ND | <1 | <1 |
| Fecal Coliform (calculated) | MPN/g | 1,809 | | | | |
| Total Coliform | MPN/100ml | 17,000 | 1,300 | 1,400 | **11,023 | **13,053 |
| Enterococcus | MPN/100ml | 500,000 | 130,000 | 30,000 | NT | NT |

Key:
ND = Non-Detect
NT = Non-Tested
Int. = Interference
* = In units of ppb
** = In Units of CFU/g

ANIMAL WASTE EFFLUENT TREATMENT SYSTEM

This application is a divisional of U.S. patent application Ser. No. 10/720,761, filed Nov. 25, 2003, which claims priority to U.S. Provisional Application Nos. 60/507,519, filed Oct. 2, 2003 and U.S. Provisional Application No. 60/428,722, filed Nov. 25, 2002, the contents of all of which are hereby incorporated by reference in their entireties

REFERENCE TO PRIORITY APPLICATIONS

This application receives priority from U.S. No. 60/428,722 entitled "Animal Waste Effluent Treatment" filed Nov. 25, 2002 and U.S. No. 60/507,519 entitled "Animal Waste Effluent Treatment" filed Oct. 2, 2003, the contents of which are incorporated by reference in their entireties.

FIELD OF THE INVENTION

The invention relates generally to sludge remediation and more specifically to conversion of sludges such as animal wastes into value added materials such as fertilizer.

BACKGROUND OF THE INVENTION

Modern municipal sewage waste treatment plants utilize conventional mechanical and biological processes to reclaim wastewaters in a process which has an overall effect of converting a water pollution problem into a solid waste disposal problem (sludges). In a typical modern treatment plant the large objects and the grit are separated. Then the wastewater goes to primary sedimentation tanks, which remove 50%-70% of the suspended solids and 25%-40% of the BOD. This sludge and the ground screenings then are subjected to anaerobic digestion. The wastewater then flows to aeration tanks, where the colloidal and dissolved organic matter are converted into gases (primarily carbon dioxide) and cell mass by the aerobic growth of microorganisms, principally bacteria. The cell mass is removed in a secondary sedimentation step and sent to anaerobic digestion. Increasingly, a final biological step reduces the nitrogen content of the effluent by converting the ammonia to nitrate and then to nitrogen gas. This process also produces a biological sludge. The combined sludges are thickened to increase their solids content and sent to anaerobic digestion. The primary purposes of digestion are to reduce the organic content, volume, and odor potential of the sludge, and to reduce the concentration of pathogenic microorganisms (Metcalf & Eddy 1979, U.S. EPA 1979, Arora 1980, Federal Register 1989). The dewatered sludge from anaerobic digestion is the largest solid output from sewage treatment plants and presents the major disposal problem.

The disposal of microbial sludge solids resulting from conventional municipal sewage treatment historically has been expensive because of the extremely large volumes with which these sludges are produced. These sludges contain high fractions of volatile solids (VS), and retain large amounts of water (70-85% before drying). Because of the substantial bulk of the waste, transportation and disposal costs are significant. Recently, the costs for disposal of these microbial sludges through conventional landfilling has risen dramatically because of decreasing landfill availability. In some areas microbial sludges are banned altogether from the landfill because of their high pollution potential.

In light of rising costs for disposing sewage derived microbial sludges, much effort has been expended into alternatives to landfill disposal such as technology which may further reduce the water content of sludges in order to reduce the bulk of the waste requiring disposal. Public concern over possible hazardous emissions through combustion processes and possible heavy metal contamination from the resulting ash has reduced acceptance of combustion (Samela, et al. Environmental Aspects of the Combustion of Sewage Sludge in a Utility Boiler, Environ. Progress, 5:110, 1986) as a disposal option for municipal sewage sludges. The land application of sewage sludge is also problematic as biological activity produces methane and residual volatile solids result in organics contaminating groundwaters.

The cost of disposing of a given amount of sludge is often high and is growing higher. Further, increased loads on existing treatment plants also lead to sharply higher disposal costs. Increasing environmental requirements on the quality of wastewater treatment have resulted in a more complex process which produces greater microbial biomass for disposal. See Laughton, P. J., "Upgrading a Water Pollution Control Plant to Meet Stringent Effluent Discharge Requirements", Water and Pollution Control, 117:14 (1979). The greater organic loading of wastewater streams has created a higher stress on the treatment process that often reduces the organic removal efficiency. See Mungsgaard et al., "Flow and Load Variations at Wastewater Treatment Plants", J. Water Pollution Control Fed., 52:2131 (1980).

This reduced efficiency degrades the sludge's dewatering properties, substantially increasing the water content and volume of the waste. See Rutherford et al., "Realities of Sludge Dewatering", Proceedings of the National Conference on Municipal Treatment Plant Sludge Management, Orlando, Fla. (1986). Finally, reduced dewatering efficiency requires increased use of organic polymers to facilitate dewatering. See Novak et al., "Mixing Intensity and Polymer Performance in Sludge Dewatering", J. Environ. Engineer, 114:1 (1988); Bandak et al., "Polymer Performance in Sludge Conditioning", Proceedings of the Eighteenth Mid-Atlantic Industrial Waste Conference, Lancaster, Pa. (1986); Doyle et al., "Sludge Conditioning With Organic Polyelectrolytes", Proceed. of the Nat'l. Conf. on Municipal Treatment Plant Sludge Management, Orlando, Fla. (1986). Increased polymer usage increases both the disposal costs and the organic loading of the waste stream. The net result is that the amount and cost of sludge disposal can increase disproportionally when an existing plant must deal with increased loadings and clean-up requirements.

Recent research often purports to reduce waste volume by improved dewatering. See Knocke et al., "Effect of Mean Cell Residence Time and Particle Size Distribution on Activated Sludge Vacuum Dewatering Characteristics", J. Water Pollution Control Fed., 58:1118 (1986); Barraclough et al., "Start-Up Optimization of the Mechanical and Chemical Parameters Influencing the Dewatering Performance of a Gravity Belt Filter Press Operation", Proceedings of the Eighteenth Mid-Atlantic Industrial Waste Conference, Blacksburg, Va. (1986); Katsiris et al., "Bound Water Content of Biological Sludge in Relation to Filtration and Dewatering", Water Res. 21:1319 (1987); Harries et al., "Design and Application of a Modem Solid/Liquid Separation Plant", S. African Mech. Engin., 37:481 (1987); Cobb et al. "Optimizing Belt Press Performance at Smurfit Newsprint", Tappi Proceedings—1987 Environmental Conference, Portland, Oreg. However, the pollution potential of the sludge is unchanged if such dewatering does not reduce the sludge's volatile fraction ("VS").

Anaerobically digested sludges contain about 40%-75% VS. The VS content of undigested sludge is even higher. See Downing et al. "Used-Water Treatment Today and Tomorrow", Ecological Aspects of Used-Water Treatment, Vol. 2, C. R. Curds and H. A. Hawkes, Eds. (1983); Ramalho, Intro. to Wastewater Treatment Processes, 2nd ed. N.Y.: Academic Press (1983). Clearly, the potential for further reductions in sludge volume remains.

In general, other animal waste such as that from bovine, ovine, and chicken is treated in a similar manner. More recently, these sludges often are converted into fertilizer. However such conversion is not easy. For example, hog manure and urine contains or evolves into ammonia, hydrogen sulfide, methane, nitrates, trihalomethanes, spores of molds, and other contaminants. Animal effluvia and putrefactive gases from animal and vegetable tissue often exist in and around hog barns. Putrefaction produces highly odorous gases and compounds such as ammonia, amino acids, aromatic fatty acids, metabolites, mercaptans, and hydrogen sulfide. A waste management system must account for these odoriferous substances, and, more importantly, must remove viable noxious microbes such as fecal coliforms, including, or course *Escherichia coli*.

A variety of techniques such as sonication are used to destroy noxious microbes as for example, described in U.S. Pat. No. 6,039,867. This patent patent describes using 700 to 1000 watts of sonication in "sonic packet" repetition and multiple passes. A side effect of sonication is heating. For example, the sonication described in U.S. Pat. No. 4,340,488 reportedly heated sludge to 70 degrees centigrade, which was described as a very desirable feature for killing microbes. Other sonication treatments may be found in U.S. Pat. Nos. 4,944,886; 4,477,357 and 5,380,445. A goal of sonication treatment is to kill as many microbes as possible, while heating the sludge with sonic energy. U.S. Pat. No. 5,380,445, for example emphasizes that 55 degrees centigrade is "the most effective" temperature for destruction.

Sonication also effects dissolved gases. While recognized as removing dissolved gases, this attribute has not been exploited generally by combination with other procedures to take advantage of gas control from the sonication itself. Another problem that is underappreciated or ignored is that microbe destruction by sonication as described in these patents is non-specific. Unfortunately in this regard, heterotrophic organisms often are desired and can assist sludge detoxification by removal of toxins and by competition with undesirable organisms. Finally, a major problem that blocks more extensive recycling of sludge as value added products such as fertilizer is the need to transport very wet materials to drying and pelleting stations. Still further most microbe killing schemes require extremely high energies and often use heat to kill microbes and to dry sludge for pelletization. Any method or system that can lower the energy costs, improve dewatering, and/or preferentially eliminate undesirable microbes can improve the cost structure for more efficient and more widespread use of sludge recycling.

Generally, sludge treatments described in the patent literature often represent scale up of laboratory methods and tools that, while suited for basic research often fails to account for large scale economies. More appropriate technology such as methods and tools for utilizing lagoons and large scale microbial conversion, often require exceedingly large resources of time, space and money to convert sludge into a form that can used, generally as fertilizer at a distant location.

SUMMARY

An embodiment is a process for removing a volatile gas from wet sludge, comprising adding zeolite to a concentration of at least 0.05 gm per gallon of the sludge; treating with ultrasonic energy to release the volatile gas from the sludge for binding to the zeolite; and removing the zeolite by flocculation. In another embodiment zeolite is added to between 1 and 20 grams per gallon. In yet another embodiment zeolite is added to between 10 and 250 grams per gallon. In yet another embodiment zeolite is added to between 0.2 to 2.5 grams per gallon.

Another embodiment is a process for inactivating anaerobic bacteria in a sludge waste stream, comprising adding zeolite to the waste stream, adding an oxidizer to the stream, treating the oxidized waste stream with strong ultrasonic energy, and removing solids from the waste stream by flocculation. The oxidizer may be added before or after the strong ultrasonic energy and the zeolite may be added before or after the strong sonication. In an advantageous process, enough ultrasonic energy is first used to lyse at least 10%, 25%, 50%, 65%, 755, 85%, 90%, 95% or more of the bacteria, and then an oxidizer is added and incubated for at least 15 seconds, 30 seconds, 1 minute, 2 minutes, 5 minutes 10 minutes or more, followed by removal of solids.

Yet another embodiment of the invention is a low energy process for economical concentration of watery sludge into a more useful form, comprising adding zeolite to the sludge, treating the sludge—zeolite mixture with ultrasonic energy at between 0.001 and 8.0 watt hours of ultrasonic energy per gram of solid in the sludge, adding a flocculant to the ultrasonically treated sludge, and placing the flocculent treated sludge into a geotextile for dewatering.

Yet another embodiment is a sludge flow stream treatment system for selectively inactivating anaerobic bacteria and creating small solid particles, comprising a flow stream with an input for watery sludge and an input for an oxidizer, a pump, an oxidizer, an ultrasonic generator of greater than 1 kilowatt output, and an output, wherein the sludge contains between 0.1 and 10% solid material and enters as a flow stream through the treatment device at a flow rate of at least one gallon per minute.

Yet another embodiment is a system for dewatering fecal waste, comprising a sonicator, a flocculent and a geotextile, wherein the sonicator is in contact with the fecal waste and creates smaller and more uniform particles in the fecal waste upon activation, the flocculent is added to the sonic treated fecal waste and the flocculent and waste combination then is added to the geotextile, allowing an elutriate to pass through the bag.

Yet another embodiment is a system for destroying fecal bacteria in a sludge stream or batch sample, comprising a source of active oxygen, and a high power sonicator of at least 3 kilowatts, wherein the active oxygen is added to the sludge stream or batch sample and then the sonicator activates the sample to at least destroy or weaken fecal bacteria in the sample.

Yet another embodiment is a method for destroying fecal bacteria in a sludge stream or batch sample, comprising adding a source of active oxygen to the sludge stream or batch sample and sonicating the resultant mixture with a high power sonicator of at least 3 kilowatts to make a more homogeneous dispersion of the fecal bacteria.

Yet another embodiment is a method for destroying fecal bacteria in a sludge stream or batch sample, comprising: sonication of the bacteria with a sonicator to form a more homogeneous dispersion; and drying the bacteria at low temperature.

BRIEF DESCRIPTION OF THE DRAWINGS

FIG. 3 shows representative test results according to an embodiment.

FIG. 4 shows test results obtained from an embodiment

FIG. 5 shows replicate measurement results for various material parameters

DETAILED DESCRIPTION

Figure 1:
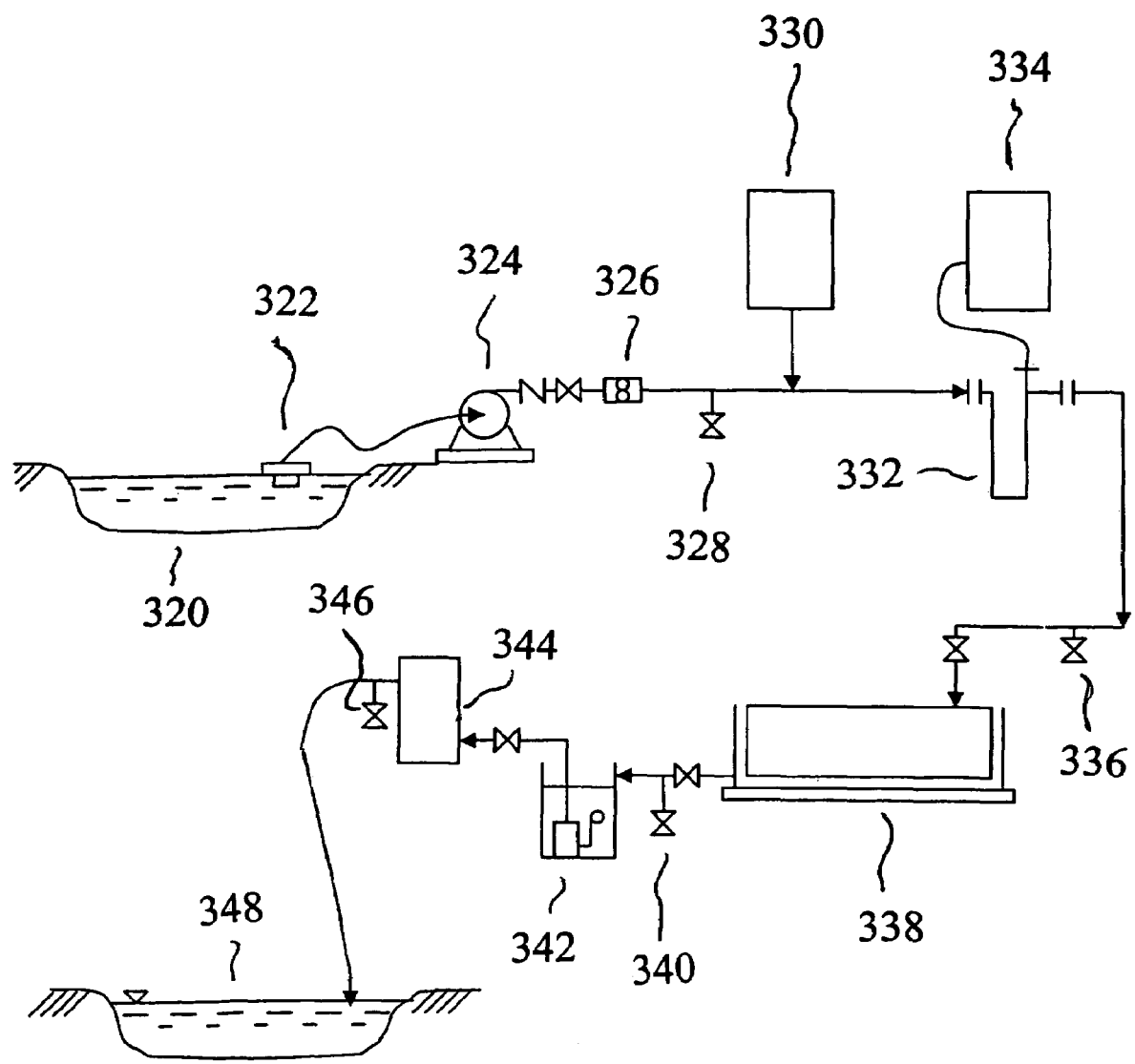
FIG. 1 depicts a swine effluent treatment process for a lagoon according to an embodiment.

Shortcomings in the previously known art are alleviated by devices, systems, methods and other discoveries that reduce odor, reduce undesirable microbes such as anaerobic bacteria, and more efficiently convert a wet sludge into a more transportable form, while incurring relatively low energy expenditure. Embodiments are useful particularly for treating sludge that contains microbes such as fecal matter, and more particularly for highly concentrated waste material such as wet suspensions, typically between 0.5 and 10% weight to volume of chicken, turkey, bovine, ovine, human or other fecal waste. The diverse embodiments described herein combine the discoveries in useful systems, methods and/or devices. However, a skilled artisan readily will appreciate that each discovery may be used independently in further embodiments that will be appreciated upon reading the specification.

In keeping with the large scale, low cost goal of the sludge remediation process, a flow system was discovered that uses "strong" ultrasonic energy in a very economical way to treat a sludge slurry to break it up. A "sludge slurry" as used herein means a sludge comprising between 0.1% to 20%, preferably between 0.5% to 10%, and more preferably between 1.5% and 6% dry solid weight per volume in water. In one experiment related to flow stream treatments, it was found that a large output (more than 500 watts, 1 kilowatt, 3 kilowatts, 5 kilowatts or higher energy) sonicator operating near 20,000 hertz could provide good performance on sludge streams, allowing the processing of up to 3, 6, 10, 20, 30, 50, or more gallons per minute of a porcine fecal sludge stream. In another embodiment suited for small scale conversion, such as waste streams between 0.2 to 20 gallons per minute and more preferably between 0.5 to 5 gallons per minute a sonicator (comprising a single unit or multiple devices together) may provide good results at lower output powers of less than 3 kilowatts, such as between 100 watts and 600 watts, 250 watts and 750 300 watts to 1 kilowatt, 500 watts to 2 kilowatts, or 750 watts up to 3 kilowatts. The term "kilowatts" in this context means actual energy (including both heat and vibration) added to the sonicated material from the sonicator and in many cases represents the total input power to a transducer such as a piezoelectric transducer or magnetorestrictive transducer.

Using the studied flow system, it was discovered that sonic energy can be exploited to release one or more odoriferous substances such as sulfur oxide, hydrogen sulfide, ammonia, nitrogen compound(s) in the presence of a binder such as a zeolite, an alum, diatametious earth, ZMS-5 zeolite, clinoptilite-zeolite, crushed sea shells, a zeolite flushed with a base to generate a non-protonated form of the zeolite, an ion exchange material and the like. Flowstream systems as well as batch systems according to this embodiment of the invention use ultrasonic energy to facilitate the transfer of such undesirable substances to an acceptor such as a zeolite. A related discovery was that undesirable microbes such as anaerobic bacteria can be killed preferentially by treatment with an active oxygen species such as ozone, hydrogen peroxide, another peroxide, oxidative product(s) of the Fenton reaction, and the like, by adding the oxidant prior to during or after ultrasonication. Without wishing to be bound by any one theory for this embodiment it is thought that sonication improves kinetics of oxidation by increasing contact of oxidant and microbe.

In yet another embodiment that can dramatically slash the energy input for sludge treatment, it was discovered that moderate ultrasonic energy (e.g. 0.005 to 5, preferably 0.01 to 1, more preferably 0.01 to 0.1 watt hours per gram of treated solid) can be used to convert sludge particles into a more homogeneous form and the particles flocculated into particles of larger than expected size for more extensive dewatering in a subsequent dewatering step. Surprisingly, a smaller amount of energy has a large effect on improving the dewatering step, particularly in combination with other improvements.

The dewatering step often uses gravity settling to make a decant, or eluant. Advantageously the dewatering is carried out using a geotextile to form an exudate, as described in PCT application publication No. PCT/US00/09809 by Richard G. Sheets Sr. and entitled "Reclamation of Materials in a Closed Environment with Remedial Water" (hereinafter the "Sheets Technology." Yet other dewatering techniques may be used in addition to or instead of a geotextile. For example, dewatering techniques commonly used by municipal waste-water treatment plants such as (i) a "belt filter" type press, comprising a system of multiple rollers and mesh belts between which bio-solids waste material travels, and which cooperate to squeeze some of the water from the bio-solids waste material; (ii) a dedicated, in-line, centrifuge apparatus, which uses centrifugal force to squeeze some of the water from the bio-solids waste material; (iii) dissolved air floatation systems, or (iv) a plate and frame filter press with hydraulic or mechanical drive, which uses mechanical pressure to dewater discrete batches of the bio-solids waste material, may be used separately or in combination with other methods. The cyclonic Tempest Drying System(™) from Global Resources Recovery Organization is particularly desirable, as is the dewatering system from Aqua International from Australia. All dewatering techniques known to skilled artisans specifically are contemplated, including, for example, air drying, steady-flow impingement drying, infra red drying, microwave drying, and drying-cylinder drying where applicable. The techniques and apparatuses described in U.S. Pat. Nos. 6,470,597; 6,447, 642; 6,393,719; 6,308,436; 6,221,261; 6,106,632; 6,030,538; 5,893,979; 5,891,342; 5,720,887; 5,695,650; 5,587,085; 5,472,620 and 5,449,464 represent some of the art known to skilled artisans and are particularly incorporated by reference, as limitations of space preclude further descriptions of these details. Many of these techniques, alone or in combination require less polymer and some can avoid the need for polymer altogether. That is, the techniques and materials used may be employed in place of (or to augment the use of) geotextile and can even eliminate some or all of the need for adding polymer and/or flocculant and/or coagulant. Desirably a user will select among one or more based on cost for a particular circumstance.

A combination of these discoveries was found to provide a relatively low cost yet high volume system for treatment of wastes such as animal fecal wastes. Still further, it was discovered that sonication at an optionally lower energy level that that used to break apart sludge provides improved dewatering. Accordingly, a desirable embodiment utilizes at least two sonication steps, a first strong sonication step for breaking apart sludge and a second step (which may use lower energy level) to facilitate coming together of particles prior to water removal. The second step, may be used alone without a first step, and preferably imparts less than 75%, 50%, 30%, 25%, 10%, 5%, or even less than 1% of the sonic energy per gram of solids in the waste stream, compared to the first strong sonication step. In another embodiment the sonication frequency of the second step is lower (longer wavelength) from that of the first step by at least 50%, 100%, 200% or more. For example, the first step may be carried out between 40,000 to 100,000 Hz, 100,000 to 200,000 Hz or higher when the second step is carried out at 19,000 Hz.

In another embodiment, a remediation process is provided in which all steps are carried out at low temperature. A "low temperature process" as termed herein means a remediation process characterized by the use of lower temperatures compared to processes that employ at least in part, elevated temperatures for killing microbes. In an embodiment all process steps take place below 50 degrees, 45 degrees, 40 degrees, 37 degrees, 33 degrees, or even below 30 degrees centigrade. The term "degrees" means a bulk property measurement, such as that measured with a regular thermometer or large size thermistor and does not mean a localized temperature that may exist within a bubble or adjacent to a surface that transmits sonication energy. In an embodiment, a low temperature process is used to generate a remediated material of between 1 to 20%, and more desirably between 2 to 8% solid and is dried at a higher temperature.

In another embodiment, a chemical ingredient or electromagnetic energy is applied that preferentially favors survival of soil organisms over undesirable organisms. Preferably the chemical ingredient is a gas such as molecular (bimolecular) oxygen, superoxide, ozone, or singlet oxygen. Other gases include molecular chlorine or bromine, and other forms of activated chlorine or bromine. An added electromagnetic energy may be ultraviolet radiation such as between 350 to 400 nanometers, and/or less than 350 nanometer.

In a desirable embodiment ultraviolet light is added from solid state devices. Presently ultraviolet emitting diodes are known. As prices drop and output powers rise these devices will become more desirable for embodiments. Although the ability to use multiple LED's in an array as an embodiment is available now, improvement in costs likely will make this technology more commercially desirable in the future. For example, one or more LEDs that generate UV light may be added along a process stream using UV transparent materials such as transparent pipes, transparent flow cells, and transparent windows to input the light. UV exposure also may be used after removal of waste from a pipe and during or before a subsequent step such as a drying step. Furthermore, UV light irradiation may be used prior to treatment in a waste stream. Preferably such chemical or light treatment is combined with a low temperature process to favor soil organisms over undesirable organisms such as facultative anaerobes.

These and other discoveries and desirable embodiments arising therefrom are reviewed next.

High Energy Sonication of Flow Streams

It was discovered that a single high output sonicator of at least 0.25, 0.5, 1, 2, 3, 4, 5, 6, 7, 10, 15, 20, 25, 30, 40, 50 kilowatts or more of energy could be used to economically process a single flow stream. Desirably, the output frequency should be above 15 kilohertz, and an optimum of 20 kilohertz was useful for an embodiment. In other embodiments not shown here, higher frequencies such as 25-30, 30-40, 50-100, 100-200, 200-1000 kilohertz or higher are useful for transferring sonic energy, particularly to progressively smaller particles. The sludge preferably contains 0.1 to 12 and more preferably 1 to 5 percent by weight solids. A flow stream to be treated with the sonic energy typically may be between 0.5 and 500 gallons per minute, but more typically may be between 5 to 100 and more often between 10 to 75 gallons per minute. For generating higher sonic energy outputs, especially above 10 kilowatts the use of two or more sonic generators (eg. driving different horns) may be desired. In such case, advantageously the drive circuits may synchronize via an adjustable phase difference to set the cycle timing of one or more sonic transducers to decrease sonic cancellation. A suitable offset can be determined by, for example, measuring energy output, detecting sonic energy delivered to the flow stream directly with a separate transducer, measuring temperature rise in the treated sludge, and direct measuring of energy in a flow stream with one or more detectors such as piezo electric devices. The monitoring and adjustment may be carried out manually, or by automated circuitry as will be appreciated by a skilled engineer. For example, the phase difference may be adjusted for maximum power output, maximum detected energy, maximum temperature increase in treated material, and/or maximum change in composition (such as density, solid content) of the treated material.

For example, a first 500 watt sonic transducer may contact a sludge stream upstream from a second 500 watt sonic transducer. If both transducers emit the same frequency sonic energy and the distance between the transducers is half (or some respective multiple) of the sonic energy wavelength, then the transducers may be driven out of phase with each other for maximum effect. In this case a 180 degrees out of phase difference may be used to prevent destructive interference and a more effect sonic energy transfer into the stream. In an embodiment two or more coordinately controlled transducers are driven with the same frequency and the frequency is adjusted to obtain best (least destructive wave interference) effect. In this method, raising the frequency provides shorter wavelength sonic energy and lowering the frequency provides longer wavelength sonic energy. If the two sonic transducers are too far apart for optimal operation, lowering their common frequency will cause their sonic vibrations to have a longer periodicity, to match the distance more effectively. If too close, raising their sonic frequency can compensate. Of course, the two or more sonic transducers may be driven at different frequencies and/or at different phase angles with respect to each other. A skilled artisan can appreciate combinations of frequency and phase shift to tune multiple sonic generators. This method is particularly desired for use with small sonicators such as those obtained from Branson, and is very useful for small modular systems where small flow rates or pipe sizes may be set depending on process needs.

In a desirable embodiment, at least one of phase angle, output power and frequency for at least one device is controlled automatically by a feedback system. Preferably the feedback system includes at least one sensor that monitors the status of sonic energy added to the waste stream, and a circuit, which may include a microprocessor or computer, fo responding to a feedback signal. For example, a feedback system may comprise a piezo electric sensor located at a distance away (at least 3 inches, 6 inches, 1 foot, 2 feet, 3 feet or more) from a sonication stage. The piezo sensor detects magnitude of the sonic energy, interharmonic mixing that creates new frequencies, altered phase angles or the like and puts out a measurement signal. In a simple embodiment the magnitude of sonic energy at the driven frequency is detected, and one or more sonic transducers are adjusted to obtain maximum measured sonic signal from the piezo detector. The feedback system may be a light device that measures reflectance, transmission, differential refraction, particle size, viscosity, fluid density, or other parameter to feed back a is signal for adjustment.

In practice, a microcomputer may control frequency, phase angle or magnitude of a driver of a transducer and may increase or decrease that parameter and then determine the effect of the increase or decrease on the measured signal. If the effect is less desirable then the controller may perform an opposite operation. If the effect is desirable, then the controller may step through again and increase the parameter. Fine tuning may involve smaller changes until an effect is not perceived. This can be done manually of course and itself also indicates information about the system. For example, a change in optimum frequency may indicate that viscosity of the material has changed, a sonic probe has worn and changed its characteristics or that something else has occurred that affected the acoustic properties of the system. In an embodiment, a change beyond a threshold value triggers an alert to a system operator. This alert may be, for example audio such as a beep or buzzer, visual such as an LCD panel display or light emitting diode, and/or an automated telephone call message. Due to the improved control associated with the use of one sonicator however, some embodiments use higher power sonicators such as the 12,000 watt UIP 12000 Industrial Processor from Heilschre (N.J.) Edge Technologies, Inc. (Ames, Iowa) for higher flow rates. Embodiments of the invention for larger scale low cost treatment systems utilize smart metal high power devices such as "terfeneol-D" as commercialized by Etrema Corporation of Ames Iowa. A terfeneol-D based sonicator was particularly useful for sludge systems because vagaries in sludge characteristics during processing can be accommodated by automated control of such a smart metal based system. The combined automated and/or manual control of one or more of the parameters: displacement, power, and frequency of such tool, particularly above 3, 5, 7, 10, 20, 25, 30, 45, 50, 60, 75, or even above 100 kilowatts with stream flow through systems of sludge particularly is valuable and will see commercial use, not only for embodiments described herein but for higher energy per unit weight or volume applications as well, leading to even greater microbe killing and even faster drying due to dissipation of sonic energy as heat.

Piezoelectric transducers may be used for sludge processing as well. One particularly desirable device comprises a transducer having front and rear masses and piezoelectric drivers on either side of a center mass that dominates the resonance mass. See for example, "THE ULTRASONIC HAMMER TRANSDUCER" by Miodrag Prokic MP of Interconsulting, Marais 36, CH-2400 Le Locle, Switzerland at http://mpi.powerultrasonics.com/hammer-transducer.html, a cached version of which is available from Google (http://216.239.53.104/search?q=cache:bQE4ja-0EycJ:mpi-.powerultrasonics.com/hammer-transducer.html+ultrasonic+hammer&hl=en&ie=UTF-8). This transducer resembles a force transducer combined with the small signal characteristics of a sandwich transducer, and is particularly useful "for driving high mass loads such as the contents of pipes."

This "hammer" transducer oscillates a dynamic center of mass, or center of inertia. The hammer device particularly is contemplated because of the very desirable features of 1) relatively easy sonic coupling to a pipe's contents; 2) relative immunity of the transducer from changes in the load (pipe contents) and 3) use of lower cost and higher efficiency piezoelectric materials. In a desirable embodiment a dual piezo transducer hammer is constructed to add sonic energy at a point in the waste stream. Typically, this point is a section of pipe that is not round but has been squared off to allow a flat surface on at least two opposing sides. That is, a point in the waste stream, which may be between 0.25 to 24 inches long, more preferably between 1 to 10 inches long has at least two opposing flat walls that vibrate. This s section may be of a different material from that of the surrounding pipe and may have a rectangular or square cross section, although two flat walls held together by oval or round sections can work well. The flat surfaces transmit sonic vibration. These flat opposite surfaces may be in contact with piezo transducers on their opposing sides and the transducers work in tandem to assert a hammer-like push pull activity.

In an embodiment the inner wall of the process stream at the point of contact with a piezoelectric hammer is not a rigid metal but another material that transmits sonic energy well and is flexible enough to move without breaking. In another embodiment the wall in contact with the transducer is metal and stress on the surrounding pipe that conducts material pass the section of pipe is alleviated by using a flexible material between the metal in contact with the piezoelectric device(s) and the surrounding pipe. A skilled artisan readily will appreciate plastics, other polymers and metals that may be used in this context. Most desirably, the material is a metal that conducts vibration energy well, but is mechanically connected (ie. plumbed) into the flow stream by a connecting segment or coupling that does not transmit sonic energy as well to the surrounding pipe. The connecting segment may comprise a flexible polymer.

The desired drive frequency and/or output power for a sonic transmitter may be adjusted as needed with a change in solids content. The adjustment of the sonic device(s) may be determined manually or by automated circuitry. The setting used to obtain a desirable result represents valuable information that the system operator may use to infer solids content. For example, if increased sonic output power is needed, or the data obtained indicate an increased solids content in the sludge stream, the operator (or automated circuitry) may react by adding more water such as ECA water or other water, upstream of the sonicator. Alternatively, a decreased solids content inferred during operation may prompt a decrease in added water. Instead of adjusting water, temperature may be, for example, raised or flow rate decreased, to compensate for increased solid. Temperature may be, for example, lowered and flow rate increased, respectively, to compensate for decreased solid. According, embodiments of the invention contemplate systems for measuring and adjusting each of these parameters, as well as software algorithms and stored computer programs to carryout out these activities.

In an embodiment, the frequency of the sonication is increased with increased or decreased detected or inferred sludge flow rate, and decreased With the opposite condition. The flow rate may be measured by any of a variety of devices and methods known to a skilled artisan. Instead of or in addition to traditional flow rate measurements a piezo electric device may be used to monitor the degree of fluidity or viscosity of the sludge and information obtained from the device used to adjust the frequency of the sonication. In one embodiment a device such as a piezo electric device is driven at a different harmonic depending on the circumstances. In another embodiment the frequency of a device such as a magnetorestrictive device is adjusted in a more continuous manner. In an embodiment after large clumps of material are detected the frequency is lowered by at least 10 percent, 25%, 50% or more or to assist sonic breaking. In another embodiment a more homogeneous material is detected and the sonic frequency is raised. In a desirable embodiment a frequency of at least 19,000 hertz is used for breaking large clumps and a frequency of greater than 35,000 hertz, more preferably greater than 70,000 hertz is used to treat a suspension of small clumps or individual micro-organisms.

In another embodiment, the energy of sonication is deliberately increased with increased sludge flow rate and decreased with decreased detected or inferred sludge flow rate. The power applied to one or more transducers may be conveniently altered as will be appreciated by a skilled artisan. In a particularly desirable embodiment the sonication energy is decreased by at least 75%, 90% or even shut off in response to detection of a decrease or lack of material. For example, an air lock, large bubble, or unexpected material (such as a piece of plastic that affects the acoustic properties of the sludge) when detected desirably should be detected to generate a signal that may cause the sonicator to shut off (or decrease power) momentarily or until another condition is met. Such obstacle preferably is detected by monitoring sonic energy transmittal, a real time viscosity measurement or other measurement such as increase in temperature from use of the sonic device or change in load impedance (for example, an increase) of the transducer. In another embodiment, the power output to the device is controlled by how much power is or may be absorbed by the sludge stream, as measured by sonic energy transmission, increase in sludge temperature, decrease in sludge viscosity or other parameter. It was found that for many embodiments, between 0.001 to 10 watt hours of sonic energy may be added per gram of solids in the flow stream. Preferably between 0.003 to 5, 0.01 to 3, and more preferably 0.03 to 0.5 watt hours per gram of solid are used. For low cost embodiments useful for large scale remediation, advantageously the sludge stream remains below 30 degrees centigrade. For example, the flow stream may be between 5 to 25 degrees, preferably between 10 to 18 degrees centigrade before sonication and between 10 to 35 degrees, and preferably 18 to 25 degrees after sonication. In some embodiments where microbe inactivity is desired, optimum temperatures may range from 0 to 10 degrees before sonication and from 0 to 25 degrees after sonication, or from 10 to 25 degrees before sonication to 25 to 35 degrees after sonication. In many embodiments a particle from a flow stream typically is exposed to sonic energy for less than 10 seconds, preferably less than 5 seconds, more preferably less than 3 seconds or even less than one second. Although sonication according to these desirable parameters may be carried out on a flow stream, the methods and materials described herein also relate to batch-wise processing, using the same or similar parameters.

In an experiment, a uniform sonic field was generated with a Heilscher cascade sonotrode. A 3 kilowatt (@20.0 kilohertz) energy output was obtained with a horn length of 36 inches and trained onto a 3.6% solids porcine fecal sludge stream having a flow rate of 6 to 10 gallons per minute. Without wishing to be bound by any one theory of this embodiment of the invention it is thought that the high intensity acoustic fields create cavitation bubbles that help release gases, converts gases into less harmful products, faciliates killing of anaerobic microbes by improving penetration of solid particles by added oxidant (if added) and actually changes the physical properties of clays and silicates (when present) to facilitate chemically binding of water into their structures, increasing resistance to drying conditions later such as when subsequently used for fertilizer, and by chemically binding nitrates and phosphates to help prevent leaching of these valuable plant nutrients into run off when treated sludge is used as fertilizer.

Without wishing to be bound by any one theory of this embodiment of the invention, it is thought that sonication at this stage, and particularly after addition of active oxygen, preferentially kills anerobic bacteria by greatly facilitating contact of oxygen with the anaerobe. Thus, although in some embodiments, sonic energy may not destroy all organisms, the sonic energy synergistically increases the natural killing power of oxygen with these undesirable microbes. In another embodiment much higher sonic energy is used, which kills all types of microbes efficiently.

In another embodiment, this sonication step is conducted prior to addition of an oxidant such as ozone and serves to increase greatly the reaction with the oxidant through improved dispersion caused by the sonication. In fact, sonication before oxidation treatment improves killing of microbes. In this case, sonication may weaken microbes and make them more sensitive, but also helps diffusion limited processes by dispersing solids into smaller particles.

Addition and Mixing of Binders Such as Zeolites

It was discovered that a binder such as a zeolite may be added prior to or after sonication to allow removal of odor such as ammonia (a common problem with chicken waste and feed cattle waste) or a sulfur compound such as hydrogen sulfide (a common problem with porcine waste). According to this embodiment of the invention, a binder such as a clay; a silicate; a zeolite; pulverized sea shells; an alum; a diatametious earth; a zeolite, such as, for example, a zeolite molecular sieve such as zeolites 4A and 5A; a mordenite; a zeolite exchanged With calcium, magnesium, potassium, or sodium ions; chabazite; and/or erionite may be used. These and other sieves are known to the skilled artisan and are described, for example, by D. M. Ruthven in *Principles of Adsorption and Adsorption Processes* (John Wiley and Sons, New York, 1984).

In a desirable embodiment, natural or synthetic clinoptilolite is used. In another embodiment ZMS-5 zeolite is used. In yet another embodiment the zeolite is flushed with a base to generate a non-protonated form prior to use. The choice of available cations used in such zeolites is extremely wide, namely Groups I, II and IIA, as well as Group IIIB, and the zeolite may be chosen on this basis, or modified for improvement. These cations may be exchanged for improved performance in some embodiments. Furthermore, in an embodiment where gaseous molecules are to be removed, hydrophobic zeolites (preferably in powdered form) are used. Also, see U.S. Pat. Nos. 5,587,003, 5,531,808 and 6,290,751, which describe clinoptilolite, LSX zeolites and other related zeolites.

Another embodiment utilizes surface modified zeolites such as that described by Professor Robert S. Bowman (see for example Environ. Sci. Technol. 36 (2002); Environ. Sci. Technol. 33:4326-4330 (1999) and Phase IIB Topical Report. U.S. Department of Energy, National Energy Technology Laboratory, Pittsburgh, Pa. 33p. "Surface-altered zeolites as permeable barriers for in situ treatment of contaminated groundwater" 2002). Most advantageously, the zeolite is modified by contacting with a large cationic surfactant such as a quaternary amine to form a stable, organic coating on the zeolite surfaces. Desirably the surfactant has a single positive charged head group and a hydrophobic tail of between 8 and 24 carbons long. Advantageously the quaternary amine is amine hexadecyltrimethylammonium or another compound of this series having a different number of carbon atoms such as an 8, 10, 12, 14, 18, 20, or 22 carbon long chain. For lower temperature processes of less than 25 degrees centigrade, a shorter chain of 8, 10, 12, 14 or 16 carbons may be more advantageous used. For higher temperatures, a longer chain of 16, 18, 20 or more carbons can be more advantageous. The binder may be added in any form such as a slurry, powder, synthetic particle and the like. The binder may be added batch wise to a slurry of sludge that is to be sonicated, or, if the sludge is a flow stream, advantageously may be added to the stream before, during or after a sonication step. When using clinoptilolite bind odor causing substances from fecal sludge, it is desirable to use a fine powder that may be suspended and added to such sludge of about 3% solids in the sludge at an amount of about 0.7 to 0.9% by weight (19.5 to 27 grams of zeolite per gallon sludge) of zeolite in the sludge. Smaller, and larger amounts such as 0.5, 1, 2, 3, 4, 5, 10, 15, 25, 35, 50, 65, 75, 100, 200, 300, 400 or even up to 500 grams or more per gallon may be used, depending on the amount of binding capacity desired. Sonication is particularly useful when dispensing, as sonic energy can break up large particles into smaller particles that may be portioned out into a flow stream or other location more readily.

In an embodiment, a solid substance such as the binder or a polymer is added via a pump stream perturbation mixer. A passive plate held within the flow stream was found to be an ideal mixer. Preferably the passive plate is at least partially perpendicular to the flow, having at least 50% of its surface area within 30% of the perpendicular, preferably at least 50% of its surface area within 15% of the perpendicular, and more preferably at least 75% of its surface within 15% of the perpendicular of the flow. In one embodiment, the plate is a single defined surface held in place by one or more attachments to the wall of the pipe. Preferably the plate has rounded edges and for example may comprise a single circular or oval shape. A clover shape was found to work well. Preferably the passive plate has a surface area that is between 2% and 30% of the cross sectional surface area of the flow stream and more preferably the plate surface area is between 5% and 20% of the cross sectional area.

The solid substance preferably is added at a distance of within 5 diameters of a passive plate mixer and more preferably within 2 diameters of the passive plate. The plate may be positioned upstream or downstream of the addition point and preferably is located upstream, to minimize contact of the solid with the perturbation mixer while allowing turbulence mixing. Most desirably, a passive plate perturbation mixer is used downstream of a strong sonication step to alleviate build up of material on the mixer. In another embodiment, a mixer is attached acoustically to a sonic transducer and is vibrated to clear the mixer of debris. The sonic transducer may be connected physically to the mixer, or may be separated by a distance. In another embodiment the passive plate is not passive but is acoustically coupled to a sonicator and actively adds ultrasonic energy to the flow stream. In a desirable embodiment the frequency of this acoustic energy is tuned to facilitate mixing of the solid material added, and in another embodiment the frequency is tuned to facilitate flocculation for dewatering.

Treated sludges typically contain about 0.5% to 12% solids, and more typically between about 1% to 5% solids. The term "solids" refers to the mass remaining after removal of salts and drying the residue. The amount of binder needed (if used) will vary with the amount and type of sludge. When used to make fertilizer from ammoniated fecal sludge, desirably zeolite such as clinoptilolite is added to bind ammonia for later release during use of the fertilizer. The zeolite, and other binders desirably are used at high ratios in sludge because of the desirable property of reversibly binding nitrogen in the process stream and then releasing nitrogen from the fertilizer product.

Remove Odoriferous Gas by Sonication and use of a Binder In an embodiment, a binder is sonicated in the presence of the waste material. Without wishing to be bound by any one theory of this embodiment of the invention it is thought that sonication of sludge such as fecal waste causes odoriferous substances such as ammonia and hydrogen sulfide to desorb from particles and/or come out of solution and become available for tight binding to an added binder such as zeolite. Sonication also facilitates diffusion into and out of particles and solid materials, and, under conditions described herein for sonication of a 30 gallon per minute flow stream, was found to more evenly disperse sludge into small particles. During sonication the zeolite binds up gas molecules that are released from the sludge slurry.

By binding the odoriferous molecule tightly, the molecule remains in the solid material during transport, drying and as a component of the final value added product such as fertilizer. A desirable molecule such as ammonia releases slowly from the fertilizer, providing plant nutrition as a long term efficient release component. Another important optional embodiment in this respect is the use of low temperature processing, from initial treatment of (for example, fecal) sludge through formulation and use as fertilizer. Many if not most alternative treatments in this field use at least one high temperature step. In contrast, desirable embodiments of the invention provide higher concentrations of solids, which require less drying, and advantageously are carried out at temperatures below 80 degrees, 70 degrees, 60 degrees, 50 degrees, 40 degrees and even below 30 degrees. These low temperatures are particularly useful for maintaining ammonia (and other compounds) in the carrier, that otherwise tend to offgas during an elevated temperature step.

The binder desirably binds up noxious gas, entraps heavy metals and may comprise macro and micro nutrient(s), silicates and clay. For example, trace metals may be added to improve the quality of the final material as a fertilizer. When present during sonication, the high mechanical sonication forces assist binding of water into the clays and other silicates, which increases drought resistance of the product used subsequently. The sonication also assists the binding of nitrites and phosphates.

Oxidant, Optionally Combined with Sonication

It was discovered that adding an oxidant before or after sonication allows greater destruction of anaerobic bacteria and in fact preferentially kills this category of microbes, particularly when used in a "low temperature process." Most desirably the oxidant is ozone, although hydrogen peroxide, other peroxides, active halogen species, and active oxygen agents as are known to a skilled artisan may be used as well. In another embodiment, an electrochemically active ("ECA") water, as described in the Sheets Technology may be added. ECA water may be added at a later time as well, such as during a dewatering step of treated sludge. Water, such as ECA water and/or water with another oxidant as described herein advantageously may be added to a sludge such as dry manure or very viscous manure, (e.g. dairy waste, unwashed out chicken waste, horse waste etc) to give the sludge a more suitable fluid handling characteristic, such as viscosity and fluid density, which affect operating parameters of the sonication step as described earlier.

Ozone may be prepared by a number of techniques, as for example, described in U.S. Pat. Nos. 6,482,370; 6,468,400; 6,461,487; 6,460,211; 6,458,257; 6,399,022; 6,361,698; and 6,328,862. Combinations of oxidants and microbe denaturation systems may be profitably employed. For example, Fentons reaction between iron and hydrogen peroxide may be employed along with ultraviolet light as, for example, described in U.S. Pat. No. 6,083,398. In particular, a number of inexpensive and stable oxidants have been developed for the laundry detergent industry and are also useful either individually or in combination as added oxidant(s), as, for example, described in U.S. Pat. Nos. 6,241,779; 6,083,398; 6,013,774; 5,965,033; 5,770,010; and 5,362,412.

An oxidant may be used in a wide variety of concentrations. The oxidant may be added for example, directly to a flow stream after dissolution into an aqueous fluid, as a gas and allowed to dissolve (as by bubbling), or as a solid form of oxidant. In the experimental example, porcine waste (3.6% solids) in a two inch flow stream pipe is treated with a 3 kilowatt sonicator at 6 to 10 gallons per minute. One and one-half grams per hour of ozone were added upstream of the sonicator, and surprisingly led to preferential killing of anaerobic bacteria. This treatment dropped the fecal coliform from 1800 MPN (most probable number) to about 750, and further dropped the coliform number to about 500 in the wet biosolids stage and to zero in the dried biosolids stage. In contrast, *Escherichia Coli* dropped from more than 242,000 MPN per 100 milliliters to 3,000 MPN per 100 milliliters from the sonication treatment (see FIG. 4). In other experiments microbe killing was much greater than this. Fecal coliform also dropped, from 1809 MPN per gram to 699 MPN per gram (FIG. 3). In other embodiments an oxidant is not used but other steps are relied on, such as further sonication, drying with heat, or even exposure to radiation such as ultraviolet radiation or ionizing radiation, for destruction of microbes such as anaerobic bacteria, virus and the like.

In a desirable embodiment ozone or other oxidant is added after sonication. Preferentially, sonication-dispersed material is exposed to the oxidant for an extended time via a residence time in a chamber such as a tank. For example, at least 1 gm, 2 gms, 4 gms, 8 gms, 16 gms, 32 gms, 75 gms or at least 200 gms per hour of ozone may be added to a 5% solids waste stream of 50 gallons per minute. This ratio of activated oxygen to waste solids can result in killing of bacteria and other organisms in the waste stream. In another study, an ozonater was plumbed to inject ozone at the rate of up to 16 gms per hour into a flow stream of approximately 50 gallons per minute. The oxidant kills hazardous micro-organisms and also improves clarity and smell of the final water product. An oxidant such as ozone has a special role in embodiments of the invention and helps discriminate between desired soil bacteria and undesirable bacteria, including many aerobes and anaerobes. Ozone can be added at any step but is best added after at least a first sonication step to break apart bacteria clumps. Ozone should be added at a level that kills bacteria and may be added at more than one step. Preferably ozone is made by a single unit with an output that splits the formed ozone into an earlier spot of a waste stream such as after sonication but before addition of zeolite, during addition of zeolite, after addition of zeolite but before addition of flocculent, and after addition of flocculant. A second stream of ozone from the same ozone maker may add ozone at another point in the remediation procedure, such as by addition to decanted waste water.

Use a Flocculant for Greater Dewatering

An unexpected result from embodiments of the invention was that sonication, which made smaller, more homogeneous sludge particles, nevertheless led to larger particles of greater settling rate upon flocculation. This feature provides several very strong advantages. One, greater dewatering is achieved at minimal or no energy cost. More complete and faster sedimentation was measured with a geotextile bags having a liner with nominal 40 micron porosity (dry) to 100 micron (wet). For example, TC Mirafy (Atlanta, Ga.) sells a product, HP 570 with a suitable porosity AOS of 30, 40, or higher and is also desirable. In fact, porcine waste comprising 3% solids after treatment with added zeolite and sonication followed by addition of polyacrylamide polymer at a final concentration of 150 ppm became concentrated to 18-19% solids by gravity alone, and in much faster time of less than 24 hours, 12 hours, 6 hours or even 3 hours. Of course, most (e.g. 80%) of dewatering occurs within about an hour. Accordingly, embodiments of the invention allow very rapid dewatering to high solid concentrations by virtue of the improved flocculent quality.

Even greater solid concentrations are possible by applying a vacuum on a geotextile lined barrier or container as described in the Sheets Technology. Another advantage is that lower temperatures are compatible for drying, as less water is present. Lower temperatures help maintain gases such as ammonia in the binder and enhanced fertilizer quality. Yet another significant advantage is that transportation and storage costs are greatly lowered by not having to store and move the excess water that is removed. Transportation costs often are a primary expense in large scale remediation. Clearly, improvement of solids compacting from, for example 7% to 18% or even from 15% to 18% yields great cost benefits.

Although many embodiments of the invention involve use of a geotextile as described by the Sheets Technology, other phase separation techniques similarly may exploit the advantages of embodiments of the invention. For example, flocculant may be added and the solids separated by a "Turbo" phase separator, as for example, described by inventor Ron Harris in U.S. Pat. Nos. 5,589,081; 6,004,461; and 5,707,535, which may use any of a variety of geotextiles. Such separators are manufactured by Spectrum Environmental, Inc. A typical geotextile fabric for screening solids used in these devices is 150 micron fiber cloth, and a filter screen of 30×40 mesh (590-420 microns) typically is used.

A large number of flocculants are known to skilled artisans and may be used for embodiments of the invention. It was found that ionic (cationic, anionic or both) flocculants work adequately, as well as non-ionic flocculants. For examples of flocculants and their use, see U.S. Pat. Nos. 6,461,511; 6,454,949; 6,447,687; 6,432,321; 6,413,433 and 6,408,227. Cationic flocculants are particularly desirable. For example, U.S. Pat. No. 3,409,546 describes the use of cationic N-(amino methyl)-polyacrylamide polymers, in conjunction with other cationic polymers for the treatment of sewage sludges. U.S. Pat. No. 3,414,514 also describes the use of a copolymer of acrylamide and a quaternized cationic methacrylate ester for sludge dewatering. Another class of cationic polymers used to dewater sludges is described in U.S. Pat. No. 3,897,333. The use of polyethyleneimines and homopolymers of cationic acrylates and methacrylates and other cationic polymers such as polyvinyl pyridines is also known. Another example of a cationic polymer useful for sludge treatment is described in U.S. Pat. No. 4,191,645. In this patent, cationic copolymers prepared from a nonionic monomer, such as acrylamide, and a cationic monomer, such as trimethylammonium ethylmethacrylate methyl sulfate quaternary (TMAEM.MSQ) or dimethylaminoethylacrylate methyl sulfate quaternary (DMAEA.MSQ) are disclosed as being useful for sludge dewatering. Other polymers include, for example, xanthan gums (such as XC or its dispersible form XCD), cellulose HP-007, algin optionally hydrolyzed to various lengths, and PHPA (partially-hydrolyzed polyacrylamide) extending polymer.

A particularly advantageous flocculant is a polyacrylamide polymer of high molecular weight such as that sold by Ondeo Nalco Company (Napierville, Ill.), which provide additional advantages when the dewatered and dried sludge mass is used subsequently as fertilizer. A cationic polymer such as polyacrylamide with low charge density is most useful for fecal waste streams although a non-organic polymer such as $Al_2(SO_4)_3$ or $FeCl_3$ may be used. Desirably, a polymer such as a flocculant is added to a final concentration of about (e.g, exactly) 1-100,000 ppm (mg/liter), and more desirably between 10-10,000 ppm, 1-20 ppm, 2-10 ppm, 5-100 ppm, 10-1000 ppm, or 25-500 ppm. When a mechanical water removal step is used such as cyclone drying, less flocculant may be employed.

In an embodiment, a flocculant is used at a higher concentration than normal for this field. For example, the Nalco 7190 polyacrylamide polymer was added to sonicated (3% solids) porcine fecal waste at 95 parts per million. That is, the low charge, high molecular weight polymer Nalco 7190 was added (150 milliliters of a 1% solution) to 4.17 gallons of effluent. Preferably the flocculant is added at more than 1.5, 2, 4, 6, 10, 15, 20, 25, 30, or even 50 times the concentration that normally is used for dewatering sludge. In fact, an overly high concentration of flocculant, which normally limits the use of a given flocculant to a small range with respect to the sludge solid, surprisingly was found to work progressively well. In another embodiment however, a very high molecular weight flocculent such as PF 601 CHHG from Cesco is used at a lower concentration.

Other polycationic polymers are useful as well. For example, plant stuffs that include at least 1%, 2%, 5%, 10%, 25% 50% or even more of a cationic polymer or other substance with a length of at least 100 nanometers, 200 nanometers, 500 nanometers, 1 micrometer, 2, 5 or even up to 10 microns long may be used as a flocculent. Such natural polymers may be obtained and partly purified, or may be converted from other biological polymers by a simple chemical reaction.

Algin, prepared from seaweed is very useful, particularly in combination with one or more divalent or trivalent cations such as calcium, which can be added later to induce phase separate at a later time. Because the final product can be fairly impure, such source is desirable for use as a flocculant in sludge, particularly fecal waste. Most desirably, algin is partially purified from seaweed to free up (remove) at least 10%, 20%, 30%, 50%, 75%, 90% or more of sodium as counter-ion compared to the 100% protonated form. The algin may be added batch wise, as a flow stream or other way, and after dispersion calcium is added. In another embodiment calcium is added first. In yet another embodiment ionized calcium is already present and is titrated with added algin. In yet another embodiment, another divalent or trivalent cation is added such as magnesium, zinc, copper or iron. In another embodiment a mixture of multivalent cations are added. Due to space considerations, flocculants and their normal use concentrations, as described in the cited U.S. patents are not listed here, and the reader is referred to the portions of each patent that provide this information.

Upon adding a flocculent, the sludge solid mass settles out more rapidly. Preferably flocculant is added to the flow stream (if used) or batch suspension and then mixed. Soon after mixing, or during mixing, the material desirably is transferred to a settling tank for dewatering. In a very desirable embodiment the settling tank has a geotextile with a porosity that allows water to leave under the force of gravity. Although the geotextile used in experiments had a nominal 40 to 100 micron porosity, larger porosity liners can be used. In an embodiment, a 100-200 micron porosity liner is used and in another embodiment a 250 micron porosity liner is used. For the larger porosities a longer molecular weight polymer, particularly a cationic polymer such as polyacrylamide or a natural biosubstance that is synthesized with cationic charges, or is converted to a polycation by a chemical reaction is recommended. Accordingly, a larger mesh size such as 30 mesh, 40 mesh, 50 mesh, 100 mesh and larger may be used. This engenders lower cost for the liner material and faster settlement rates, as well as higher solids content of the dewatered sludge.

Separation of Water, and Water Clarification I

In an embodiment, a treated waste stream undergoes a phase separation step wherein waste water is separated from solids. The term "phase separation" in this context means that a water fraction that has at least 50%, 2 times, 3 times or more water removed compared with the waste stream before the water separation step. In one system constructed for this purpose, a high molecular weight polymer is added and mixed prior to a decanting step wherein a waste stream is flowed into a large container that allows removal of heavy materials that sink and/or removal or decant of water closer to the top.

In another system, a sonicator is used for phase separation enrichment of a water fraction. For example, a plane ultrasonic wave field generated by a sonicator may be established within the waste stream, such that the acoustic energy interacts with water suspended solids circulating in a channel flow, so that acoustic radiation forces separate solids into two or more fractions based on particle radius. This sonic separation is particularly useful after addition of a high molecular weight polymer such as described herein. In an embodiment, the fiber is a thickening agent such as a naturally occurring polyanionic material that is added upstream of the sonic separator. Algin, for example, may be used. In another embodiment, sonic separation is followed by a concentration—decant step wherein the polymer fraction is further dewatered. In the case where a large poly ion is added, a multivalent counter ion may be added at the later step. Upon addition, the polymer fraction dewaters by virtue of tightening of the polymer from ionic attraction with the counterion. As one example, algin is added, an optional phase separation by ultrasonic wave field is carried out, and then calcium is added to the polymer containing fraction to generate a supernatant that can be removed. The devices and methods designed for separation of wood pulp wastes from a waste stream, as reported by researchers at the Institute of Paper Science and Technology are particularly useful and illustrates some steps in this technique. See, for example, U.S. Pat. No. 5,979,664, the contents of which, and particularly the methods and materials for separating liquid from sludge solids, is incorporated by reference in its entirety.

These water clarification steps may be used separately or in combination with each other and preferably take place as a late step in a waste treatment procedure. Most desirably, a water decant step occurs after polymer has been added. Removed water may be further polished by passing through a sand filter, biological filter, or other filter as is known to the skilled artisan.

In a desirable embodiment, a large sand filter is used to remove organic material such as solid/dissolved nitrogen by virtue of a bed of micro-organisms in the filter that remove the organic material. The sand filter also may be relied on to remove fines from minerals such as zeolites that have been added to the process flow. The sand filter may be backwashed to regenerate itself. In an embodiment a sand filter is used with a bed of at least 6 inches, 1 foot, 2 feet, 3 feet or more. In another embodiment ozone or other oxidant is added to the water before during or after application to a sand filter.

Other Treatment Parameters

Minimize ammonia volatilization In an embodiment a low pH material such as an acid is added, preferably to the waste before pumping into the system, in order to maintain a low pH to alleviate off-gassing of ammonia. In another particularly desirable embodiment, all steps prior to an optional final drying step are carried out at below 60 degrees, 50 degrees, 40 degrees, 35 degrees, 30 degrees, or even less than 25 degrees centigrade. In particular, a combination of low (or ambient) temperature with use of an ammonia binder in the process is particularly desirable to prevent off gassing of ammonia. In another embodiment, one or more urease inhibitors such as N-(n-butyl)thiophosphoric triamide or cyclohexylphosphoric triamide are added to material in advance to inhibit the conversion of urea to ammonia. The inhibitor may be added to the floor of an animal containment facility, wash down water, in the feed or drinking water, and desirably is continuously or periodically added by a metering device. In another embodiment, a transgenic animal, such as a transgenic swine is made by transgenic addition and expression of a urease inhibitor protein. In yet another embodiment a bacterium that converts urea into another form such as a more reduced form is added to the animal feed, drink, wash down fluid, the floor, or directly to the feces.

A bacterium that expresses an inhibitor is particularly desirable. Long term presence of an inhibitor at the animal facility and particularly in a location such that the inhibitor mixes into the urine is most desirable. Yet another embodiment inhibits the production of ammonia by addition of one or more of triple superphosphate, superphosphate, calcium chloride and gypsum. Alum, ferrous sulfate, and phosphoric acid also can reduce ammonia volatilization. Alum addition is particularly useful in combination with phosphoric acid addition and ferrous sulfate addition. Each of these ammonia volatilization strategies may be used in combination with any and all devices, and methods detailed herein.

Combine system parameters It was found that combining a low temperature process with the use of zeolite (or other ammonia gas absorber) gave particularly low ammonia emission. In an embodiment, sonication at the lower or ambient temperatures allowed good dispersion and killing without strongly elevated temperature. Accordingly, strong sonication combined with the use of a mineral that absorbs ammonia gas is particularly useful and provides surprisingly good results. The further combination of strong sonication, use of mineral binder, and low temperature particularly is recommended. Also recommended is the addition of an oxidant such as ozone. Still further, phase separation by addition of absorbent such as a charged high molecular weight polymer (either cationic, anionic or zwitterionic) is particularly desirable. For low costs, and to add soil building properties to the final product, the polymer preferably is a natural product and may in some cases be unpurified. For example, alginate, prepared by a simple base treatment of seaweed may be used as a thickening agent to provide a pumpable material that can be controllably hardened by the application of a divalent or trivalent cation, such as calcium. The hardening agent may be added at any time. Most desirably, at least some of the hardening agent is added at a dewatering step, or a step where particles are produced, such as in a rotary drum or cyclone dryer. For example, calcium chloride, calcium hydroxide, or other form may be added as a powder or after forming a dense solution or suspension.

In another embodiment dewatering of ionic polymer (and or zeolite or other solid matrix) containing waste streams is carried out electrolytically. For example, algin containing suspensions can be flowed past electrodes to allow an anode of sufficient size and dimensions to precipitate the algin by removing charges. The precipitated algin can be decanted, scraped off, or otherwise removed and/or a liquid fraction removed to increase solids content.

Strong sonication is preferred to generate a good dispersion early in a method as described herein. However, sonication additionally may be used in other steps as well. For example, sonication may be used prior to or during a gas removal step to facilitate removal of gas from the treated material. In an embodiment, phase separation occurs via sonication. A skilled artisan will appreciate how to make and use a phase separator sonication step in a treatment process. A two step sonication process is desirable wherein low frequency sonic power of less than 40 kilohertz is used to disperse a clumped material and then a high frequency sonic power of above 20 kilohertz is used to kill microbes. Most preferably, the high frequency is between 50 and 100 kilohertz, 75 to 150 kilohertz, 100 to 200 kilohertz, 200 to 500 kilohertz, 500 kilohertz to 2 megahertz, or even higher.

Generally, the higher frequencies are used to disrupt small particles such as bacteria or even smaller, and the lower frequencies are used to disrupt clumps. In a particularly desirable embodiment, a (generally) low efficiency sonication with a magneto restrictive material such as terfenol D is carried out at a (often lower) power to disperse clumps. Then a high efficiency piezo electric material is used at a higher frequency to disrupt micro-organisms. This strategy exploits the differential advantages of the two types of sonicators. The generally popular magneto-restrictive devices are very hardy but low frequency (typically less than 35 kilohertz) and low energy efficiency (typically about 40%). The piezo electric devices are more sensitive to load variations but can work at much higher frequencies and are much more energy efficient. In this embodiment, a low frequency and robust sonication converts a lumpy slurry to a more homogeneous dispersion and a subsequent high frequency high efficiency sonication disrupts microbes. In an embodiment, the high frequency piezo is tuned (typically by selecting a frequency multiple) or a device is selected for a frequency that provides enhanced killing. Typically, frequencies of 100 kilohertz or more are desirable in this respect. A feedback control system may be used to adjust sonic power, selection of sonic driver, and/or selection of sonic driver depending on a measured parameter such as turbidity, conductivity, back pressure, and the like.

In another embodiment, sonic energy is used to convert an added ingredient into smaller fragments before, during or after addition to a flow stream. For example, zeolite mineral may be in different sizes, even within the same batch. By sonicating the zeolite, particularly before addition, and in the dry state, smaller sizes that can more readily react and which can be dispensed more easily may be obtained. Sonic energy also may be used to renew a sand filter or other filter used to clarify water obtained by the process.

Combine with further treatment steps. In a related embodiment, a variety of treatment steps known in the art of sludge remediation may be used in combination with embodiments of the invention. For example, electroflocculation, which has been explored for some years may be added as a step. This step particularly is contemplated between the ultrasonication step and the flocculant step. In another embodiment, hydrogen sulfide, and/or other odoriferous gases are minimized by the addition of other substances, including live substances such as probiotic bacteria, before or after sonication. As will be appreciated by a skilled artisan, a pure or mixed culture of probiotic bacteria such as *Chromanium, Rhodospirillum, Chlorobium, Chloroflexus*, and *Thiobacillus* or as described in U.S. Pat. No. 6,410,305 may be added to a sludge before treatment or after sonication, when the sludge may be at its highest temperature. One unexpected feature of an embodiment of the invention was that aerobic or facultative aerobic organisms such as fecal coliforms and probiotic bacteria can survive many sonication conditions, and may continue to operate, to reduce sulfide (or other gas) concentration after the sonication step, in some embodiments of the invention. In fact, one or more bacteria, enzymes, yucca schidigera, ferrous chloride and other oxidizing agents such as, for example, oxygen, halogen gases and the like, may be added to the organic waste material sludge in a waste facility or flow stream prior to treatment and can be welcome additions to the treatment. Of course, other oxidants, further sonication, exposure to ultraviolet light, ionizing radiation, and the like may be added at one or more steps of an overall treatment procedure.

Overall Processes

In a desirable embodiment for the conversion of swine manure into fertilizer, manure is collected at a feedlot and the wastewater collected sent into ultrasonic treatment system. The treatment system may be at the feedlot site or may be at a central location. Accordingly a flow stream may be directly connected from the feedlot to the ultrasonic treatment system or may be off loaded at a regional facility. At the ultrasonic system, a binder such as a zeolite is added, an optional oxidant may be added, and then the material is sonicated, as described above. (In other embodiments the binder and/or oxidant are added during or after sonication.) After sonication a flocculant is added and the material is dewatered. In a most desirable embodiment, dewatering occurs within a transport container such as an ISO container, as described by the Sheets Technology. Following dewatering, (or during dewatering in some embodiments), the concentrated solids may be transported to a pelletizing plant, which further dries the material and pelletizes it for subsequent use as fertilizer.

FIG. 1 shows a representative process flow for converting solids in an effluent to fertilizer according to an embodiment for treating sludge in a lagoon. Here, sludge from manure pit or lagoon 320 is pulled off via suction from floating pump 322 and enters wastewater feed pump 324. The material passes totalizing flow meter 326. A sample may be drawn or a characteristic of the flow stream may be detected at 328. By way of example, 328 may contain a piezoelectric sounding device that emits a sonic vibration and also piezoelectrically detects one or more qualities of the vibration to determine the solids content. Temperature (for example, a thermoelectric couple detector or thermister), salt (ionic strength measured as conductivity) and/or opacity (light transmission) also may be detected. A binder such as a zeolite is added from reservoir 330 to the flow stream.

Ultrasonic treatment occurs via sonicator 332 under control of control panel 334, which may automatically adjust power, phase shift, frequency, displacement, and/or amplitude of the sonicator, addition of water, and/or sludge stream flow rate in response to detection of solids from an earlier position such as at sample 328. After sonication, and an optional addition of flocculant (not shown) optional sampling may occur at position 336 and the waste stream sent into roll-off boxes with filter bag (338 in the figure). During the dewatering step that occurs in roll off box 338, water is removed, sampled at 340 and sump/transfer pump 342 transfers the elutriate through sand absorbent filter 344, with sampling at 346 and into flushing water discharge pit or lagoon 348. Of course, various permutations of this scheme are possible, as will be appreciated by a skilled artisan. For example, the design of the sand absorbent filter preferably is the same as those employed as sand filters in septic fields and other pressurized mound systems. In a particularly desirable embodiment roll off boxes 338 are replaced by another drying mechanism such as a vortex dryer, and optionally the flocculant is decreased or even eliminated as needed to optimize with the other dewaterer.

Figure 2:
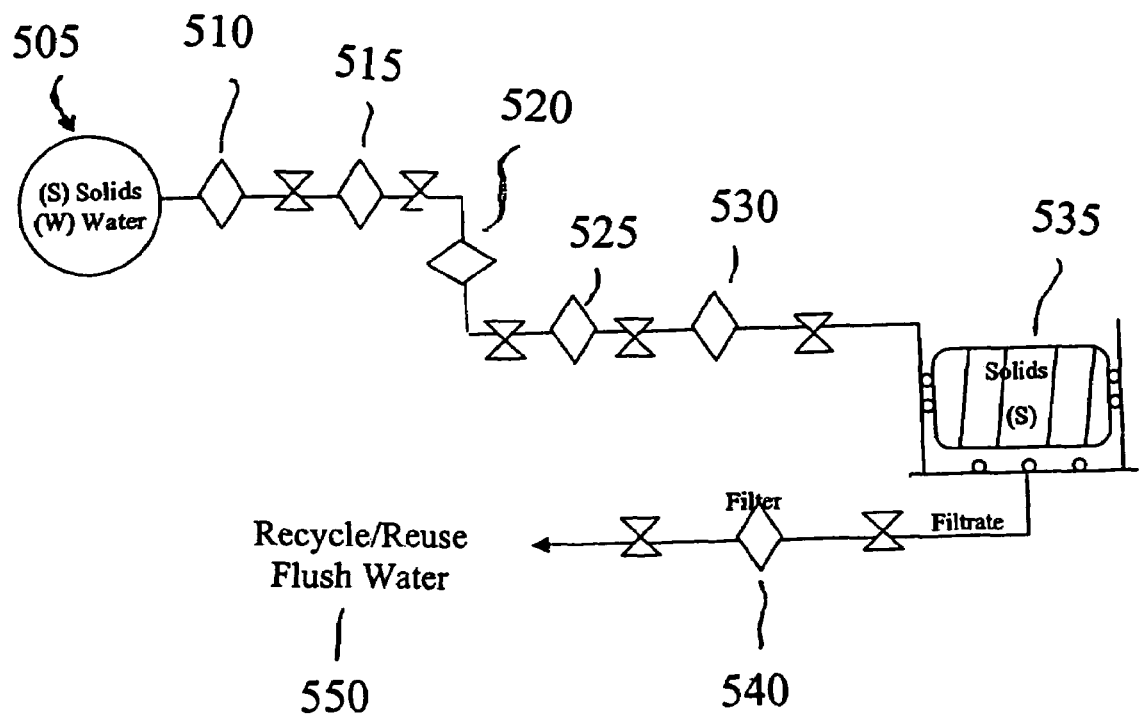
FIG. 2 depicts a process flow according to an embodiment.
Figure 2:
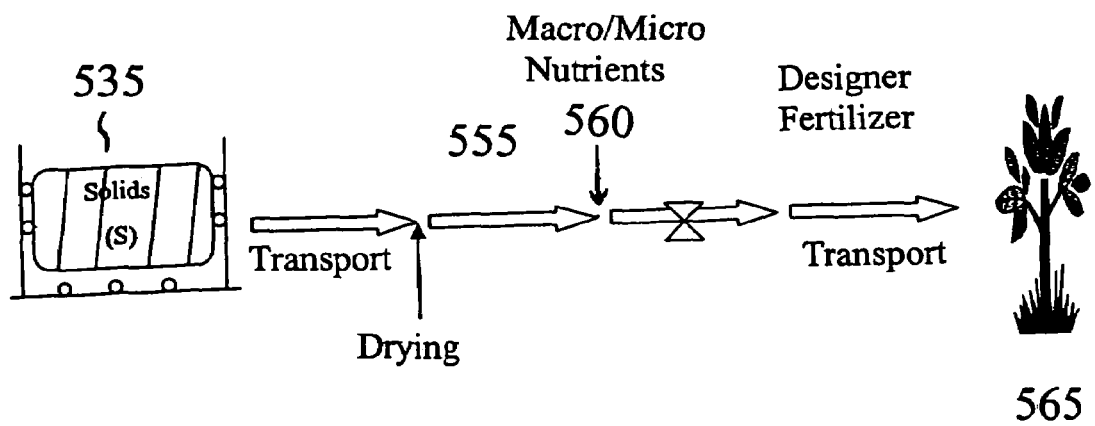

FIG. 2 shows a schematic outline for a process flow from animal waste effluent to fertilizer. In this example, starting effluent 505 having typically 1-6% solids enters a waste stream. Although not shown here, water may be added, under control of a monitor of density or solid content (using, for example sonic probing), and/or temperature, ionic strength and turbidity measurement(s). A binder such as zeolite is added at 510, and an optional oxidant or other treatment applied at 515. (The mixers, which often are used for each addition step are not labeled but included in the drawing.) The stream enters ultrasonic chamber 520, optional electroflocculation step 525, addition of flocculent 530 and then proceeds to geotextile lined container 535. Elutriate from container 535 passes through sand and zeolite filter 540 and becomes available as 550 recycling/reuse water. Meanwhile, solids, which have been concentrated in container 535 are transported by truck and/or rail to air drying and pulverization station 555. At station 555 other macro/micro nutrients 560 optionally are added. The dried and pelleted fertilizer, which may be considered "designer fertilizer" from having controlled addition of nutrients, is transported and distributed for use in growing plants 565.

Overall processes as described herein provide unexpectedly great destruction of undesirable microbes that are regulated under water quality EPA rules even without the application of heat. This provides great economy of operation by removing the need for a high energy input. As seen in the table of FIG. 3, *Eschericia Coli*, originally present at more than 242,000 MPN per 100 milliliters were destroyed to 3,000 MPN per 100 milliliters after sonication and (see FIG. 3) to low amounts in wet solids. Viable fecal coliform decreased from 7,000 MPN per 100 milliliters (FIG. 3) to 3,000 MPN per 100 milliliters from the treatment but essentially were undetectable in the final product. In contrast, heterotrophic bacteria survived sonication, and/or apparently thrived, being measured at 2.9 million per 100 milliliters before sonication, 3.6 million per 100 milliliters after sonication (FIG. 3), 9.95 million CFU per gram of wet solids (FIG. 4) and 3.35 million CFU per gram after resuspension from the dry state (FIG. 4). FIG. 5 shows replicate measurement results for various material parameters such as heavy metals, minerals, bacteria, total solids, etc. Bacteria are greatly diminished and heavy metals are found to be low in the finished product. These data and other data present in these tables indicate that the treatment (sonication of waste stream, optionally including an added oxidant plus zeolite) removed undesirable organisms at the expense of desired heterotrophic organisms.

Without wishing to be bound by any one theory for this embodiment of the invention, it is believed that the sonication step provides desirable killing of bacteria, and furthermore, weakens other microbes, and otherwise alters the sludge environment resulting in maintenance of heterotrophic organisms at the expense of organisms that have been adapted to live in animal intestines. That is, condition(s) are established in the overall treatment that are compatible with the viability of soil organisms such as heterotropic organisms but that are incompatible with the viability of many fecal organisms. An embodiment of the invention provides a low temperature method for selective destruction of fecal organisms in favor of soil organisms. It is believed that low temperature (less than 50, 40, 35, and more preferably less than 30 degrees centigrade) sonication in the presence of oxygen, and optionally in the presence of an added oxidizer, combined with lower temperatures used for drying provides this desirable result and is specifically contemplated. *Enterococcus, Escherichia Coli*, total coliform, fecal coliform and others that reside in an animal's intestines, are decreased, as they are more sensitive to sonication in the presence of the oxidant, and apparently became weakened.

Table 1 shows strong reduction in odor from ammonia and hydrogen sulfide, obtained from practice of an embodiment. The first 2 lines of this table show results for untreated samples. The four next lines are treated but left in a wet state. The last four samples have been dried. Improvements in other categories such as heavy metal contamination, as shown in the figures were obtained as well.

TABLE 1

| Sample | Odor Threshold | | Hydrogen Sulfide | |
|---|---|---|---|---|
| Ammonia | | | | |
| Untreated Effluent | 4136 | 18000 ppb | 157 | ppm |
| Untreated Effluent | 3293 | 30000 ppb | 240 | ppm |
| Treated, wet | 8435 | 6500 ppb | 77 | ppm |
| Treated, wet | 4878 | 11000 ppb | 164 | ppm |
| Treated, wet | 2552 | 233 ppb | 3 | ppm |
| Treated, wet | 1299 | 430 ppb | 7 | ppm |
| Dried Biosolids | 168 | 12 ppb | 0 | ppm |
| Dried Biosolids | 154 | 24 ppb | 0 | ppm |
| Dried, Earthseal(TM) | 134 | 27 ppb | 0 | ppm |
| Dried, Earthseal(TM) | 88 | 30 ppb | 0 | ppm |

In a particularly desirable embodiment, a swine waste stream of approximately 5% solids was pumped at about 50 gallons per minute into a flow stream and zeolite material was added as described above. The mixture then was sonicated at a station with a 3 kilowatt magnetorestrictive sonicator, which disperses the waste solids into a fine dispersion. The stream then was oxidized by addition of about 16 gms of ozone per hour. A large 190 gallon vessel was used to allow good dissolving and contact of ozone with the process stream at 30-40 gallons per minute. After ozone treatment, a low cationic high molecular weight PDF601 dried powder acrylamide polymer from Cesco Corp. (Bellingham, Wash.) was added. The material next transferred into a large chamber that allows a more dense fraction to settle out. A water enriched fraction was decanted. The solid material was removed and was in a concentration of about 10 percent solids. The removed solid material was transferred to a dryer. A cyclone drier as commercialized by Global Resource Recovery Organization is preferred and was used. See U.S. Pat. No. 6,506,311 entitled Method and apparatus for processing wet material (issued Jan. 14, 2003), the methods and materials of which most particularly are incorporated by reference. The decanted water fraction is passed through a sand filter of at least about 3 feet depth and then discharged.

In a test of this last embodiment on swine waste in Iowa, the results presented in Table 2 were obtained using a 10 gallon per minute recirculating process and air drying. Table 3 results were obtained using a 30-50 gallon per minute process and cyclone drying. These tables show percentage of nutrients such as total nitrogen, organic nitrogen, calcium, carbon etc. in dried solids. Fecal coliform bacteria were reduced to very low levels as seen here.

TABLE 2

| Analysis % | 3.6% Manure | Air-Dried Solids |
|---|---|---|
| TKN | 0.69 | 3.31 |
| Organic - (N) | 0.47 | 0.04 |
| Nitrate (N) | 0 | 0.001 |
| Total (N) | 0.69 | 3.31 |
| Total (P) | 0.17 | 3.94 |

TABLE 2-continued

| Analysis % | 3.6% Manure | Air-Dried Solids |
|---|---|---|
| Total (K) | n.a. | 2.1 |
| Calcium | 3.23 | 0.2 |
| Carbon | 0.72 | 26.9 |
| Solids | 3.63 | 86.2 |
| Fecal Coli form MPN/100 ml | 7000 | <2 |

TABLE 3

| Analysis % | 2.8% Manure | Air-Dried Solids | Tempest Dried |
|---|---|---|---|
| TKN | 0.48 | 1.5 | 3.07 |
| Organic - (N) | 0.4 | 0.56 | 0.93 |
| Nitrate (N) | 0.13 | 0.37 | 0.43 |
| Total (N) | 0.61 | 1.87 | 3.5 |
| Total (P) | 0.07 | 1.2 | 2.0 |
| Total (K) | n.a. | n.a. | 1.8 |
| Calcium | 0.06 | 1.93 | 3.09 |
| Carbon | 2.0 | 17.7 | 23.4 |
| Solids | 2.82 | 44.5 | 87.8 |
| Fecal Coli form MPN/100 ml | 4700 | <2 | <2 |

In another embodiment ozone is also added after the decant step. In yet another very advantageous embodiment, ozone is used to backwash the sand filter that is used to treat the decant water before discharge. It is found that ozone treatment removes toxins from the water.

In a very desirable embodiment useful as a carbon dioxide sink, carbon dioxide gas is added to the wet waste stream and is absorbed during the process. Carbon dioxide desirably is obtained as a waste gas from a power supply or other industrial source. For example, the remediation process can be sited near to a fossil fuel burning power plant, fossil fuel burning incinerator, boiler, or other combustion source, and the fossil fuel combustion exhaust, which is rich in carbon dioxide, is either bubbled or otherwise introduced, either directly, or after passing through a filter first. In an embodiment, the carbon dioxide rich gas is bubbled into a large vessel, that also introduces bubbled ozone. In an embodiment the carbon dioxide gas includes oxygen gas and the treated waste stream becomes at least 10%, 20%, 30%, 40%, 50%, 65%, 75%, 85%, 90%, 95% or more saturated with the combined gas.

In an embodiment useful for decreasing the release of carbon dioxide, a waste gas stream from a fossil fuel powered engine, or other facility is added to the waste stream and allowed to react with the dissolved calcium there. Desirably, the waste gas stream contains heat energy and imparts that heat to the waste stream. In this case, advantageously, the dissolved carbon dioxide and calcium are at concentrations and at a temperature suitable for conversion into a calcium carbonate precipitate. A skilled artisan can optimize these conditions as suited, for example, by increasing temperature as needed at a location where precipitate may be removed, as for example by decanting. Advantageously, hot carbon dioxide enriched waste gas from a fossil fuel burner is added at the end of the process, after sonication, after addition of any oxidant, after flocculation (if used) but prior to the drying step. Accordingly in an embodiment carbon dioxide enriched hot waste gas is introduced with sufficiently high carbon dioxide concentration and sufficient heat to cause calcium carbonate precipitation.

In another particularly desirable embodiment, decanted water is separated further by an acoustic separation technique, to remove small particles such as cells and mineral fines. The techniques and materials used to acoustically separate out particles from flow streams as for example described by U.S. Pat. Nos. 5,996,808; 5,979,664; 5,803,270; 5,523,058; 5,472,620; 5,395,592; RE33,524; 4,673,512 and 4,550,606. The descriptions of each cited patent pertaining to details of methods for separating particles and fibers most particularly are incorporated by reference, as space limitations preclude adding those details to the present specification. In particular, it is desired to use the sonic separation detailed in U.S. Pat. No. 5,472,620, wherein a polymer is added to a fluid suspension of materials and facilitates separation of particles upon sonic energy addition. In this embodiment, aqueous fluid containing at least one polymer is flowed into a vessel or location of an enlarged part of a waste stream and acoustic energy is applied to the fluid at an intensity level sufficient to induce cavitation within the fluid. The solids are allowed to agglomerate in at least one position within the vessel or enlargement of the stream, and the agglomerated solids are then separated from the fluid.

Designer Soil, Pond Builders

Large scale use of an embodiment can significantly improve soil quality by increasing soil water retention, prolonging soil nitrogen release, and/or adding one or more desirable nutrients. Polymers used for flocculation and/or other separation of water from waste stream such as polyacrylamides bind water, and their presence in fertilizer made from the process is desirable for that reason. Minerals added, and especially zeolites slowly release water and nitrogen. The amounts and types of polymers and minerals added may be adjusted as desired for a particular type of soil. Accordingly, contemplated embodiments also include methods for the process adjustment, marketing and use of the end product of a process as described herein. In many instances a solid product having a solids content of from 5-10%, 7-12%, 10-15%, 20 to 30% or even more is sold as a fertilizer or soil builder.

In an embodiment a purchaser or would be purchaser requests a certain type of fertilizer or soil builder based on the mineral needs of the intended crops that would use the product. The concentrations of one or more of the following nutrients are adjusted within the product by, for example, their addition anywhere to the process stream, or in some instances by their selective non-removal: ammonia, urea, nitrate, phosphorus, potassium, copper, molybdenum, selenium, and zinc. Some nutrients such as selenium may be added or altered in form by the addition of the element to the livestock or to their feces, to allow metabolism of the element. For example, a fertilizer of high organic selenium value can be made by adding inorganic selenium to the water and/or solid food of the livestock (or to the bacteria in their feces). Swine (and their gut dwelling bacteria), for example, tend to synthesize reduced forms of selenium such as trimethyl selenium (in the urine) and seleno-methionine (in the feces). A designer fertilizer can be made that contains such added organic selenium, which can not leach out of the soil as easily. Other elements can be added as well.

Embodiments of the invention provide superior aquaculture ponds, as will be appreciated by users in the Philippines, Vietnam, Thailand, Cambodia, Africa, Indonesia, China, Taiwan, India, Burma, and other locations. As described for example, by A. Dhawan and S. Kaur in The ICLARM Quarterly (Vol. 25; No. 1) January-March 2002 (pages 11-14), pig waste can greatly improve aquaculture of some species of fish. In an embodiment, one or more features of the process, such as sonication to destroy microbes, optionally with addition of an oxidant and polymer, may be used as a process step before returning pig waste to an aquaculture farm in such location. Most preferably the sonicated waste is added to a pond harboring a carp such as *Catla catla* and *Labeo rohita*. A streamlined process involving at least sonication is preferred for this embodiment. After sonication, optionally a polymer such as an acrylamide or algin (with calcium or other multivalent cation) may be added and the mixture decanted to remove some of the water. In an embodiment wet swine waste is pumped through a sonication cell that destroys at least some bacteria and disperses the remaining bacteria. An oxidant optionally is added and allowed to incubate. Then a thickener such as alginate is added and ionic calcium and/or other multivalent ion added to facilitate thickening before spreading on a field or adding to a fish pond. The thickener helps the material slowly degrade and can provide a longer duration release characteristic than is had otherwise.

This streamlined low cost process can provide significantly improved health compared with present conditions. In a simplest process, pig waste is flowed through at least a short pipe into a pond harboring a carp, wherein the pipe (or section of pipe) contains a high power sonicator. Sonicated waste then flows into the pond, where the nutrients support zooplankaton and phytoplankton growth, which in turn supports fish growth. In another embodiment, chicken fecal waste is sonicated to remove fly larvae and other organisms. Preferred sonic power and frequency are as detailed above. In another embodiment, a desirable nutrient for fish, or other pond live such as plants or zooplankton, is added before, during or after sonication. An advantage of sonication is that many substances that are not easily dissolved may be readily suspended by sonication, which disperses a substance throughout the pond upon mixing Each soil, pond, farm and even farm field has a different set of conditions and requirements. A farmer may use a fixed apparatus containing one or more components are described herein, or may use a mobile waste process system. Desirably, an outside partly builds, maintains, and runs the mobile waste process system and makes the system available by appointment. The same party can arrange a designer product by adding one or more nutrients to the flow stream. When the farmer uses the solid output for spreading onto a field, one or more micronutrients can be added to the process, by way of a separate hopper, for example, and metered into the soil this way. Most desirably, however, the farmer adds the micronutrient to the livestock or to their feces (by spraying a water solution or wash down liquid for example), to convert the nutrient into a form that may persist in the soil longer. Bacteria in the swine waste can metabolize many different micronutrients and the farm itself can carry out many conversions.

When ordering for a swine waste remediation unit to service his swine waste for example, a farmer may specify one or more nutrients that may be added to the flow process for enhanced fertilizer value. Some soils may lack sufficient zinc or selenium and such micronutrient may be added not only via the flow process described herein, but also to the waste (or animal) before waste treatment, to allow microbes or the animals themselves an opportunity to convert the nutrient into a desirable form. The micronutrient may even go into the waste water and provide enhanced value of that water.

Analogous designer soil builders can be decided upon on site, or custom ordered to prepare a solid product (or waste water product) having improved water retention, mineral retention or nitrogen retention. A very low cost natural product such as zeolite or alginate desirably may be added to the process. In many cases, as described herein, such product benefits the process by improving efficiency or alleviating ammonia release, as well as the soil.

Designer Insecticides, Fungicides

In another embodiment, a mineral or microorganism is added to the process stream, or to the waste before processing, to enhance value of the solid as a biocide. For example, high levels of zinc, iron and/or molybdenum are thought to combat Pierce's disease when applied to a plant. Pierce's disease arises from a bacterial infection that is sensitive to the application of such minerals, as described by the work of Bruce Kirkpatrick of U.C. Davis. By adding high levels of one or more of these nutrients during the process, a material can be made that not only supplies nutrients to the soil but also inhibits the Pierce's disease bacteria. In another embodiment, after disruption of microorganism by sonication, one or more desirable bacteria or fungi are added, and which eventually utilize the released nutrients to grow. Such organisms include those discovered by Agraquest, of Davis Calif. In embodiments of the invention, one or more microbial strains identified in any of U.S. Pat. Nos. 6,586,231; 6,524,577; 6,291,426; 6,245,551; 6,210,665; 6,077,506; 6,060,051; 6,027,723; 6,015,553; 6,001,637; 5,919,447; 5,906,818; 5,869,042; 5,733,544; 5,691,191; and 5,645,831 are added before or during the flow process. The identifications and descriptions of beneficial microorganisms provided in these cited patents particularly are incorporated by reference.

Each patent and other publication referenced herein specifically is incorporated by reference in its entirety.

I claim:

1. A system for treating animal waste, comprising:

a) a flow stream with an input for watery animal waste;

b) a pump with adjustable flow rate within the flow stream;

c) an oxidant injector coupled to a stream of oxygen for adding oxygen to said flow stream;

d) an adjustable power ultrasonic generator connected to inject sonic energy into the flow stream;

e) at least one temperature detector operably connected to a manual system or automated circuitry to control at least the adjustable pump or adjustable power ultrasonic generator; and f) an output;

wherein the manual system or automated circuitry is configured to respond to the temperature detector by controlling the maximum temperature of the flow stream to 50 degrees Centigrade or less.

2. The system of claim 1, further comprising an input for a micronutrient coupled to a source of the micronutrient for adding micronutrient to said flow stream.

3. The system of claim 2, wherein the micronutrient is selected from the group consisting of zinc, iron, molybdenum and selenium.

4. The system of claim 1, further comprising a transducer for detecting sonic energy delivered to the flow stream by the ultrasonic generator.

5. The system of claim 1, comprising a means for controlling the power output to the ultrasonic generator based on a detected increase in flow stream temperature.

6. The system of claim 1, comprising a software algorithm; for controlling pump rate to maintain maximum sensed temperature below 50 degrees Centigrade.

7. The system of claim 1, further comprising a tank located downstream of the ultrasonic generator and downstream of the oxidant injector, the tank sized to allow an extended residence time of sonication-dispersed material with oxidant.

8. The system of claim 1, wherein the oxidant injector is located downstream from the ultrasonic generator.

9. A system for treating animal waste, comprising:

a) a flow stream with an input for watery animal waste;

b) a pump with adjustable flow rate within the flow stream;

c) an oxidant injector coupled to a stream of oxygen for adding oxygen to said flow stream;

d) an injector coupled to a carbon dioxide enriched waste gas stream for adding carbon dioxide to said flow stream;

e) an adjustable power ultrasonic generator connected to inject sonic energy into the flow stream;

f) at least one temperature detector operably connected to a manual system or automated circuitry to control at least the adjustable pump or adjustable power ultrasonic generator; and g) an output;

wherein the manual system or automated circuitry is configured to respond to the temperature detector by controlling the maximum temperature of the flow stream to 50 degrees Centigrade or less.

10. The system of claim 9, further comprising an input for a micronutrient coupled to a source of micronutrient for adding micronutrient to said flow stream.

11. The system of claim 10, wherein the micronutrient is selected from the group consisting of zinc, iron, molybdenum and selenium.

12. The system of claim 9, further comprising a transducer for detecting sonic energy delivered to the flow stream by the ultrasonic generator.

13. The system of claim 9, comprising a means for controlling the power output to the ultrasonic generator based on a detected increase in flow stream temperature.

14. The system of claim 9, comprising a software algorithm for controlling pump rate to maintain maximum sensed temperature below 50 degrees Centigrade.

15. The system of claim 9, further comprising a tank located downstream of the ultrasonic generator and downstream of the oxidant injector, the tank sized to allow an extended residence time of sonication-dispersed material with oxidant.

* * * * *